United States Patent
Sztuk et al.

(10) Patent No.: US 11,435,593 B1
(45) Date of Patent: Sep. 6, 2022

(54) SYSTEMS AND METHODS FOR SELECTIVELY AUGMENTING ARTIFICIAL-REALITY EXPERIENCES WITH VIEWS OF REAL-WORLD ENVIRONMENTS

(71) Applicant: Meta Platforms Technologies, LLC, Menlo Park, CA (US)

(72) Inventors: Sebastian Sztuk, Menlo Park, CA (US); Steven Paul Lansel, East Palo Alto, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 350 days.

(21) Appl. No.: 16/403,646

(22) Filed: May 6, 2019

(51) Int. Cl.
| | | |
|---|---|---|
| *G02B 27/14* | (2006.01) | |
| *G02B 27/01* | (2006.01) | |
| *G02B 6/28* | (2006.01) | |
| *G06T 7/70* | (2017.01) | |
| *G06T 19/00* | (2011.01) | |

(52) U.S. Cl.
CPC ............ *G02B 27/148* (2013.01); *G02B 6/28* (2013.01); *G02B 27/0172* (2013.01); *G06T 7/70* (2017.01); *G02B 2027/014* (2013.01); *G02B 2027/0138* (2013.01); *G06T 19/006* (2013.01)

(58) Field of Classification Search
CPC .... G02B 27/148; G02B 6/28; G02B 27/0172; G02B 2027/0138; G02B 2027/014; G02B 27/01; G02B 27/0101; G02B 27/0149; G02B 27/017; G02B 27/0176; G02B 27/0179; G06T 7/70; G06T 19/006
USPC ...... 359/13–14, 629–633; 345/7–9; 348/115; 349/11
See application file for complete search history.

(56) References Cited

U.S. PATENT DOCUMENTS

| | | | | |
|---|---|---|---|---|
| 2012/0068913 A1* | 3/2012 | Bar-Zeev | ........... | G02B 27/0172 345/8 |
| 2012/0293548 A1* | 11/2012 | Perez | ...................... | G06F 3/012 345/633 |
| 2016/0314624 A1 | 10/2016 | Li et al. | | |

* cited by examiner

*Primary Examiner* — Marin Pichler
*Assistant Examiner* — Alberto J Betancourt
(74) *Attorney, Agent, or Firm* — FisherBroyles, LLP

(57) ABSTRACT

The disclosed computer-implemented method may include (1) displaying one or more images to a user via a display comprising multiple display regions, (2) switching each of the display regions to a blocking state in which a view of the user's real-world environment in a corresponding region of the user's field of view is blocked from the user, (3) detecting a pass-through triggering event involving one or more objects in the user's real-world environment, (4) identifying one or more display regions corresponding to a region of the user's field of view occupied by the object, and (5) switching each of the one or more display regions to a pass-through state in which the view of the user's real-world environment in the corresponding region of the user's field of view is passed through to the user. Various other methods, systems, and computer-readable media are also disclosed.

15 Claims, 31 Drawing Sheets

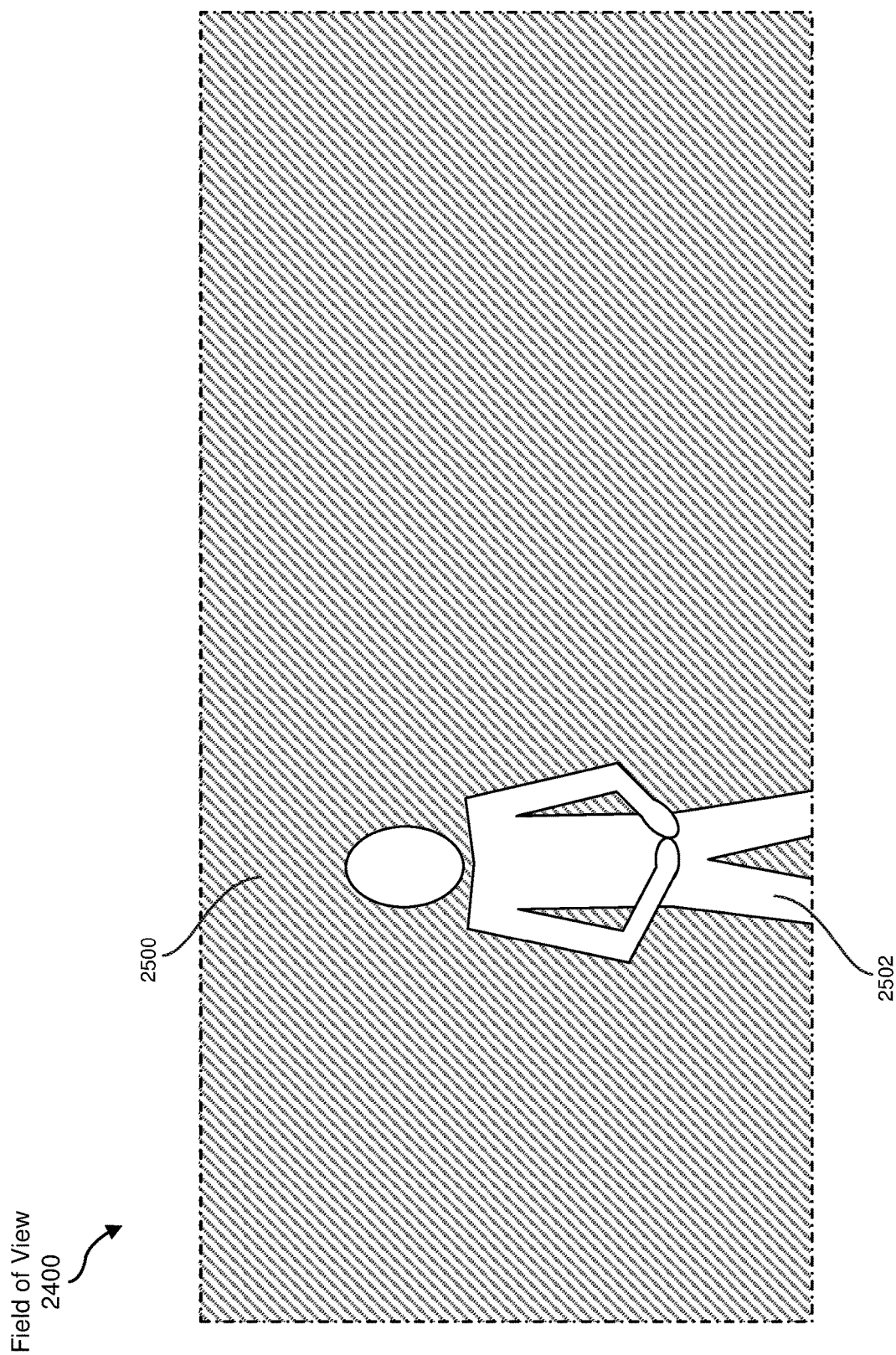

Spiropyran                    Merocyanines

SYSTEMS AND METHODS FOR SELECTIVELY AUGMENTING ARTIFICIAL-REALITY EXPERIENCES WITH VIEWS OF REAL-WORLD ENVIRONMENTS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 24 and 25 are illustrations of a user's field of view while the user wears a head-mounted display system, according to some embodiments of the present disclosure.

Figure 1A:
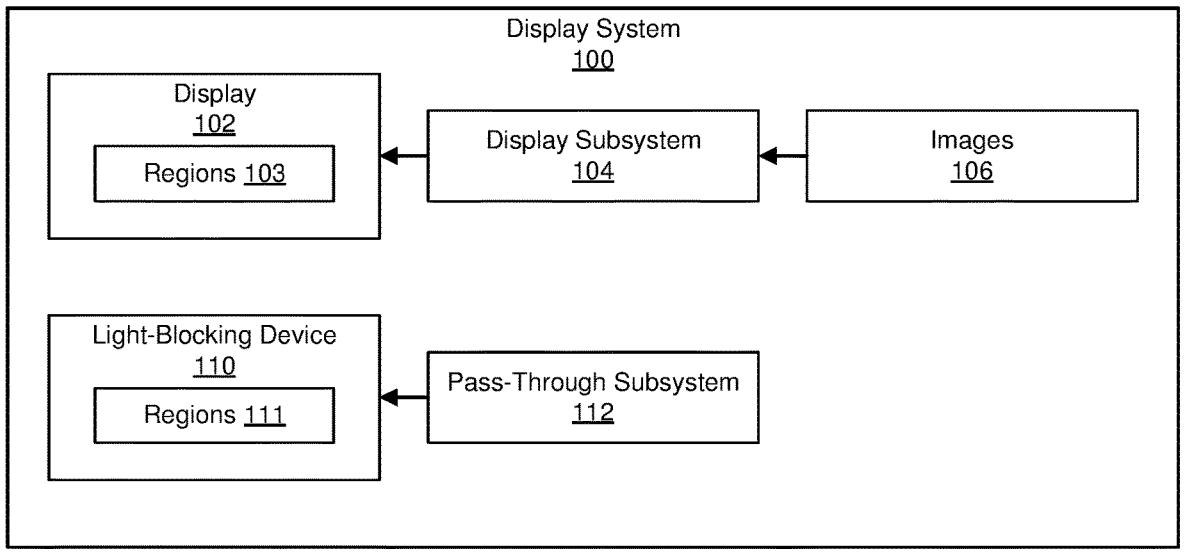
FIG. 1A is a block diagram of an exemplary display system for selectively augmenting artificial-reality experiences with optical views of real-world environments according to some embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for selectively augmenting artificial-reality experiences with optical or digital views of real-world environments. Artificial reality systems are widely gaining in popularity for use in a growing number of activities. Augmented reality, mixed reality, and virtual reality devices or headsets, for instance, may enable users to experience events, such as interactions with people in a computer-generated simulation of a three-dimensional world or viewing data superimposed on a real-world view. These devices and headsets may also be used for purposes other than recreation. For example, governments may use such devices for military training, medical professionals may use such devices to simulate surgery, and engineers may use such devices as design visualization aids. Augmented reality systems, mixed reality systems, and virtual reality systems may enable users to have immersive or semi-immersive experiences (i.e., these systems may display digital elements to users that block or obscure all or a substantial portion of a user's view of his or her real-world environment). For example, in augmented reality systems, electronically-generated images may be overlaid as augmented reality image elements onto a user's view of his or her real-world environment. In mixed reality systems and virtual reality systems, different portions of a captured scene or an artificially generated scene may be displayed to a user. To facilitate a sense of immersion with a scene, a virtual reality system may block all or much of the ambient light from a user's real-world environment from reaching the user's eyes. Unfortunately, while engaged in immersive experiences with a virtual environment, users may forget or become less aware of important aspects of the users' real-world environment. For example, a user trying to walk from one position in a virtual environment to another position may fail to account for (or be unable to see) a real-world obstacle in his or her path, such as a table, a couch, or a wall due to the user's lack of awareness of the real-world environment.

When using an artificial reality system to have immersive experiences with virtual environments, users may find it difficult to interact with real-world objects (e.g., phones, computing devices, controllers, keyboards, writing tools, furniture, etc.) without removing the artificial reality systems or otherwise breaking their immersive experiences. For example, some artificial reality systems may include head-worn display systems and/or near-eye displays (NEDs) that, when worn by a user, may obstruct a line of sight between the user's eyes and one or more real-world objects. This lack of visual feedback may cause inefficiencies in user interaction with real-world objects while users are wearing such devices. This may be particularly problematic when such real-world objects may include the user's hands and/or one or more input devices associated with the artificial reality system (e.g., an artificial reality input device, a game controller, etc.). For example, it may be difficult for a user to locate and/or pick up a game controller associated with the artificial reality system while wearing a head-worn display system.

As will be explained in greater detail below, the systems and methods disclosed herein may selectively augment artificial-reality experiences with optical or digital views of real-world environments. Embodiments of the present disclosure may have one or more advantages over conventional artificial-reality systems. For example, by selectively augmenting artificial-reality experiences with optical or digital views of real-world hazards, the systems and methods disclosed herein may improve users' safety. Moreover, by selectively augmenting artificial-reality experiences with optical or digital views of real-world objects or people, the systems and methods disclosed herein may enable users to interact with the real-world objects or people without having to remove or adjust a head-mounted display and/or without losing immersion in artificial-reality experiences. The systems described herein may increase social or environmental awareness when needed and break immersion when needed.

In some examples, the systems and methods described herein may allow light emitted by or reflected by real world content to optically or digitally pass through a head-mounted display to a user (e.g., as the user is totally immersed in a virtual reality environment). By enabling the user to see some of the real-world objects or people in his or her environment, embodiments of the present disclosure may enhance the user's interaction with the objects and people and/or create a safe environment for experiencing virtual reality, augmented reality, and/or mixed reality. In some examples, a combination of a transparent display (e.g. a waveguide display) and an electrochromic (smart glass) material or thin film liquid crystal switchable mirror may be used to enable the user to see through certain regions of the transparent display and not others. Alternatively, cameras on the outside of a head-mounted display device may capture images of the user's environment from which specific objects may be identified, extracted, and displayed to the user. The systems described herein may selectively augment artificial-reality experiences with optical or digital views of real-world environments based on user intent, scene understanding, and object recognition. Real-time tracking of objects may enable the systems described herein to pass through only certain real-life objects in only some circumstances so as to maintain fully immersive experiences as much as possible.

The following will provide, with reference to FIGS. 1-31, detailed descriptions of various pass-through display systems that selectively augment artificial-reality experiences with optical or digital views of real-world environments in response to various triggering events.

FIG. 1A is a block diagram of an exemplary display system 100 that may present one or more images 106 to a user via a display 102. In some examples, display system 100 may operate in a virtual reality system environment, an augmented reality system environment, a mixed reality system environment, or some combination thereof. In some examples, some or all of display system 100 may be included in a head-mounted display device (such as those illustrated in FIGS. 9, 10, 30, and 31).

As shown, display system 100 may include a display subsystem 104 (e.g., a display driver) that presents, via display 102, a variety of content to a user, including virtual views of an artificially rendered virtual-world environment and/or augmented views of a physical, real-world environment. In some examples, the augmented views may be augmented with computer-generated elements (e.g., two-dimensional (2D) or three-dimensional (3D) images, 2D or 3D video, sound, etc.). In some examples, images 106 may convey a scene (e.g., a captured scene, an artificially-generated scene, an evolving artificial-reality environment, or a combination of the same) to the user.

In various embodiments, display 102 may include a single electronic display or multiple electronic displays (e.g., a display for each eye of a user). Examples of display 102 may include a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a waveguide display, a digital light processing (DLP) display, another suitable transparent display, or some combination thereof. As shown, display 102 may include a plurality of display regions 103 (e.g., pixels or subpixels) that are individually controllable. In some examples, each of display regions 103 may be transparent or partially transparent, at least when not displaying an image or video, such that ambient light from a user's real-world environment is able to pass through the display region.

As shown in FIG. 1A, display system 100 may include a pass-through subsystem 112 for controlling a light-blocking device 110 capable of selectively blocking ambient light emitted by or reflected by objects in a real-world environment from reaching a user's eye. Light-blocking device 110 may have a variety of forms. For example, light-blocking device 110 may form or be integrated into the lens or lenses of a head-mounted display device. In other examples, light-blocking device 110 may form a layer of an otherwise transparent display or housing of a head-mounted display device.

Light-blocking device 110 may include a plurality of blocking regions 111 that are individually addressable and switchable between at least a blocking state (e.g., an opaque state or a shuttered state) in which light is blocked from passing through the region and a pass-through state (e.g., a transparent state or an unshuttered state) in which light is allowed to pass through the region. In some examples, each of blocking regions 111 may be oriented relative to a corresponding one or more of display regions 103, such that, when in a blocking state, the blocking region blocks light from reaching or passing through a corresponding display region. In some embodiments, light-blocking device 110 may be a liquid crystal layer that is divided into regular or irregular regions that can be independently turned dark or clear. Light-blocking device 110 may use any appropriate approach for blocking or transmitting light, including e-inks, reflective devices such as MEMS mirrors or thin film liquid crystal switchable mirrors, photochromic materials, electrochromic elements, and the like. For example, spatially selective electric field application to an electrochromic layer may be used to achieve localized light blocking or transmittance.

In at least one embodiment, each of blocking regions 111 of light-blocking device 110 may be an optical shutter (e.g., a liquid-crystal shutter or mechanical shutter) capable of blocking or controlling light transmittance. An optical shutter may have pixels that have dark or light states. In a dark state, the pixel may be generally opaque and block light from a portion of the local environment from reaching the user's view. In a light state, the pixel may be relatively transparent, allowing light from the local environment to pass through the pixel and reach the user's view. In some examples, a blocking element may include pixels with multiple available state options (for example, clear/dim/opaque, or clear/variable dimness). For example, an optical shutter, such as a liquid crystal shutter, may have pixels that have at least one gray state in addition to the dark and light states.

In some embodiments, light-blocking device 110 may include guest-host liquid crystal shutters that include, for example, a liquid crystal layer (such as a nematic liquid crystal) incorporating a dye (e.g., including dye molecules oriented within a nematic liquid crystal). In some embodiments, a nematic liquid crystal molecule may include a dye moiety. In some embodiments, a liquid crystal layer may include a polymer dispersed liquid crystal (PDLC, where the liquid crystal may be a nematic liquid crystal) or a polymer-stabilized liquid crystal, such as a polymer stabilized cholesteric texture.

Figure 1B:
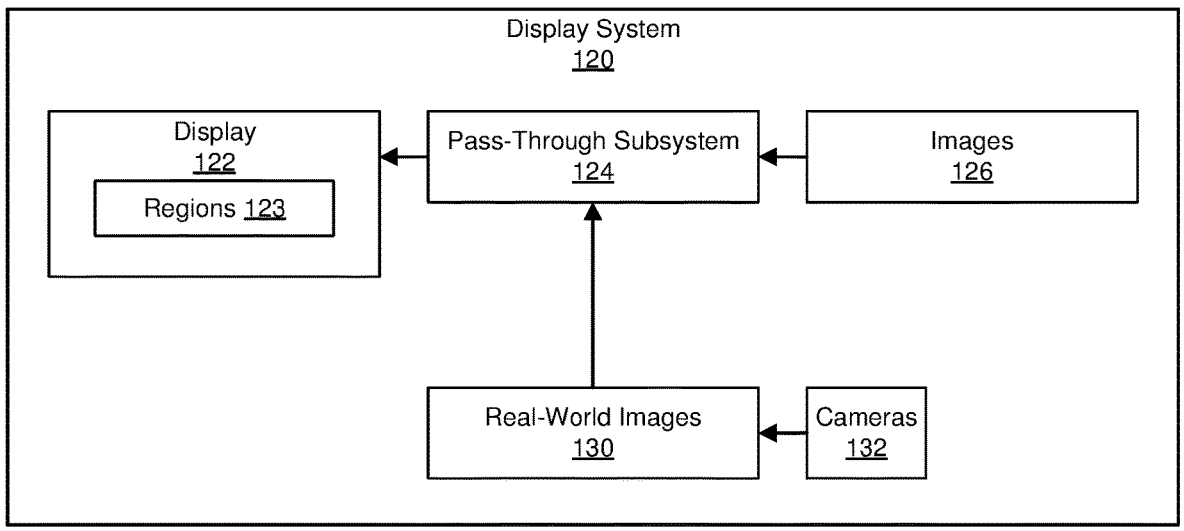
FIG. 1B is a block diagram of an exemplary display system for selectively augmenting artificial-reality experiences with digital views of real-world environments according to some embodiments of this disclosure.

FIG. 1B is a block diagram of another exemplary display system 120 that may present one or more images 126 to a user via a display 122. In some examples, display system 120 may operate in a virtual reality system environment, an augmented reality system environment, a mixed reality system environment, or some combination thereof. In some examples, some or all of display system 120 may be included in a head-mounted display device (such as those illustrated in FIGS. 9, 10, 30, and 31). As shown, display system 120 may include a pass-through subsystem 124 that presents, via display 122, a variety of content to a user, including virtual views of an artificially rendered virtual-world environment and/or augmented views of a physical, real-world environment. In some examples, the augmented views may be augmented with computer-generated elements (e.g., two-dimensional (2D) or three-dimensional (3D) images, 2D or 3D video, sound, etc.). In some examples, images 126 may convey a scene (e.g., a captured scene, an artificially-generated scene, an evolving artificial-reality environment, or a combination of the same) to the user.

In various embodiments, display 122 may include a single electronic display or multiple electronic displays (e.g., a display for each eye of a user). Examples of display 122 may include a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, another suitable display, or some combination thereof. As shown, display 122 may include a plurality of display regions 123 (e.g., pixels or subpixels) that are individually controllable. In some examples, display system 120 may be part of a fully blocked virtual-reality system, and/or each of display regions 123 may be opaque such that ambient light from a user's real-world environment is unable to pass through the display region. Additionally or alternatively, display 122 may be contained within a housing that prevents ambient light from a user's real-world environment from reaching and/or passing through display 122. In some examples, each of display regions 123 may be individually switchable between at least a blocking state in which a portion of images 126 is displayed and a pass-through state in which a portion of real-world images 130 is displayed. Cameras 132 may capture a digital view of a user's real-world environment. Pass-through subsystem 124 may control when or which portions of display regions 123 will display images 126 and which portions will display real-world images 130.

In some embodiments, display systems 100 and/or 120 may be configured to completely obstruct a user's view of his or her real-world environment and/or completely block all ambient light from the real-world environment from reaching the user's eyes. In other embodiments, display systems 100 and/or 120 may be capable of only partially obstructing the user's view of his or her real-world environment and/or only partially blocking ambient light from the real-world environment from reaching the user's eyes.

Figure 2A:
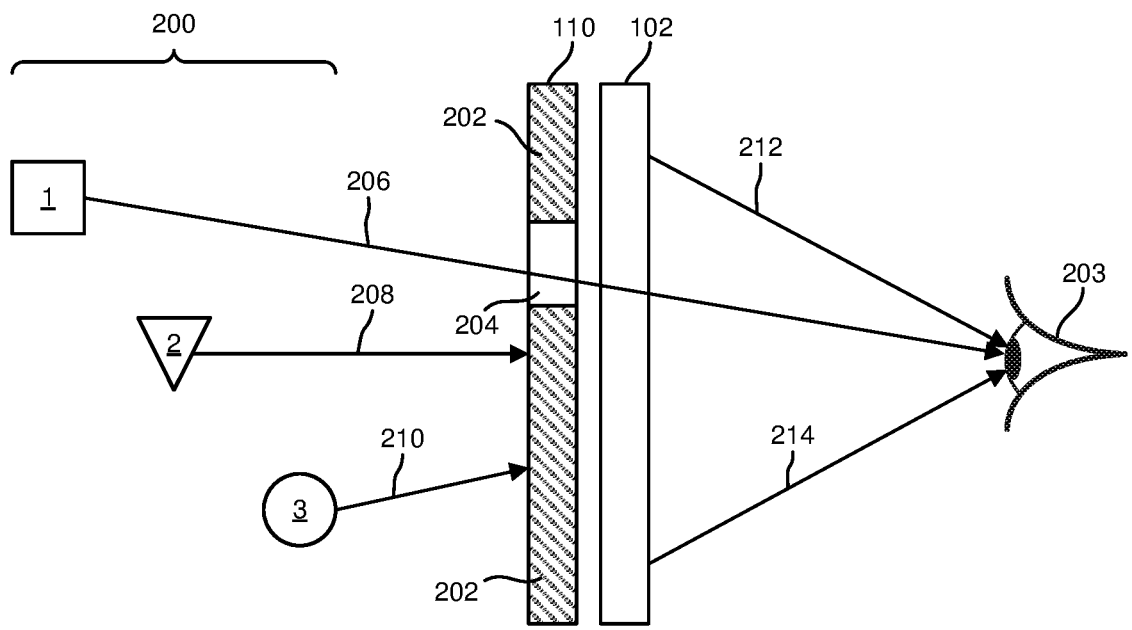
FIG. 2A illustrates the exemplary display system of FIG. 1A in an example real-world environment.
Figure 2B:
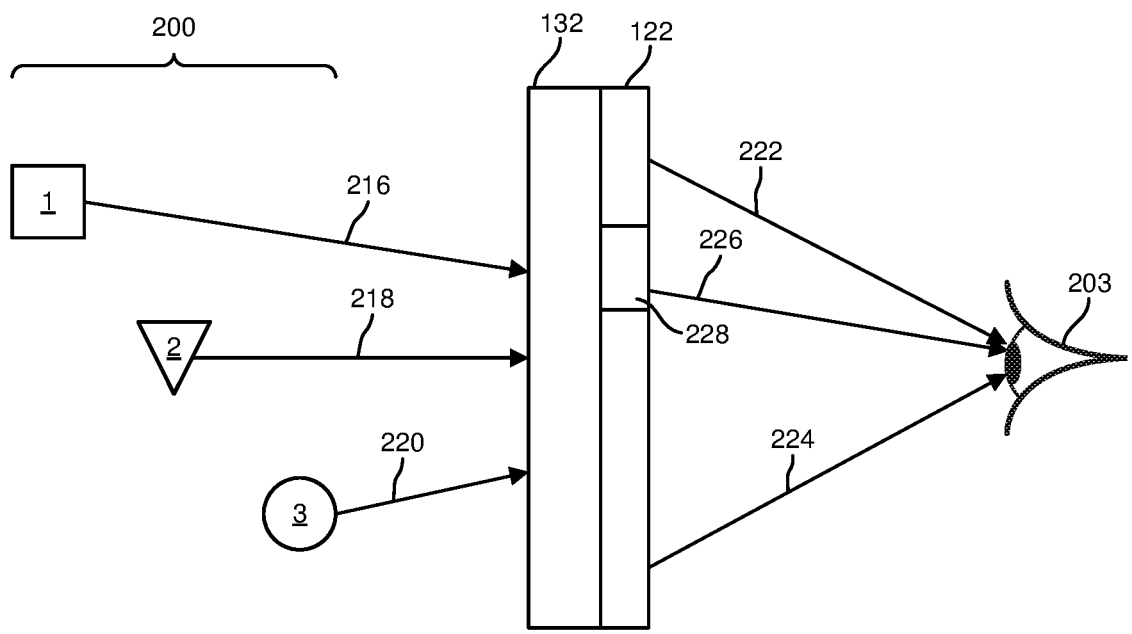
FIG. 2B illustrates the exemplary display system of FIG. 1B in an example real-world environment.

FIGS. 2A-2B illustrate an exemplary real-world environment 200 within which display systems 100 and/or 120 may operate. In the example illustrated in FIG. 2A, pass-through subsystem 112 may set or switch blocking region 202 of light-blocking device 110 to a blocking state and blocking region 204 to a pass-through state in order to pass light 206, which has been emitted or reflected by object 1, through to a user's eye 203 and block light 208 and 210, which has been respectively emitted or reflected by objects 2 and 3, from reaching the user's eye 203. In this example, light 212 and light 214 may represent light that is emitted by display 102 and that conveys images 106.

In the example illustrated in FIG. 2B, one or more cameras 132 (e.g., one or more stereo or mono cameras) may generate real-world images 130 (e.g., stereo or mono images) by capturing light from real-world environment 200. A portion of real-world images 130 containing a relevant region of real-world environment 200 may then be digitally passed through display system 120 to a user. For example, cameras 132 may capture light 216, 218, and 220, which have been respectively emitted or reflected by objects 1, 2, and 3, to form real-world images 130. In this example, pass-through subsystem 124 may digitally pass light 216, but not light 218 and 220, through to user's eye 203 by displaying a portion of real-world images 130 containing object 1 via display regions 228. In this example, light 222 and light 224 may represent light that is emitted by display 122 and that conveys a portion of images 126 and light 226 may represent light that is emitted by display 122 and that conveys the portion of real-world images 130 containing object 1.

As shown in FIGS. 2A and 2B, real-world environment 200 may include an object 1, an object 2, and an object 3.

Objects 1-3 may represent tangible objects within a user's real-world environment. In some examples, objects 1-3 may represent objects with which a user can interact with an evolving artificial-reality environment. For example, objects 1-3 may represent a game controller, a sword, a shield, a ball, a racket, a baseball bat, a golf club, etc. In some examples, objects 1-3 may represent objects within a user's real-world environment that may be or become a hazard to the user. For example, objects 1-3 may represent stationary hazards such as walls, doorways, furniture, household items, or other types of potential obstacles or tripping hazards that may be present in an environment in which a user uses a virtual reality system. Additionally or alternatively, objects 1-3 may represent moving hazards within a user's environment. For example, objects 1-3 may include vehicles, people, animals, thrown objects, autonomous machines, or the like.

In some examples, objects 1-3 may represent certain objects within a user's real-world environment with which the user wishes or is likely to interact. For example, objects 1-3 may represent remote controls, light switches, food or beverage containers, clocks or watches, doors, furniture, etc. In other examples, objects 1-3 may represent the user's computing devices (e.g., a mobile phone, tablet, or laptop computing device). In other examples, objects 1-3 may represent a user's Input/Output (I/O) devices (e.g., a keyboard, mouse, stylus, or display). In some examples, objects 1-3 may represent people in a user's environment. In some examples, people that are co-located with the user may displayed as pass-through elements (e.g., in a virtual meeting), which may enable better or more natural person-to-person interactions. In some examples, objects 1-3 may represent portions of a user's body. For example, objects 1-3 may represent a user's hands, arms, feet, legs, etc.

Figure 3:
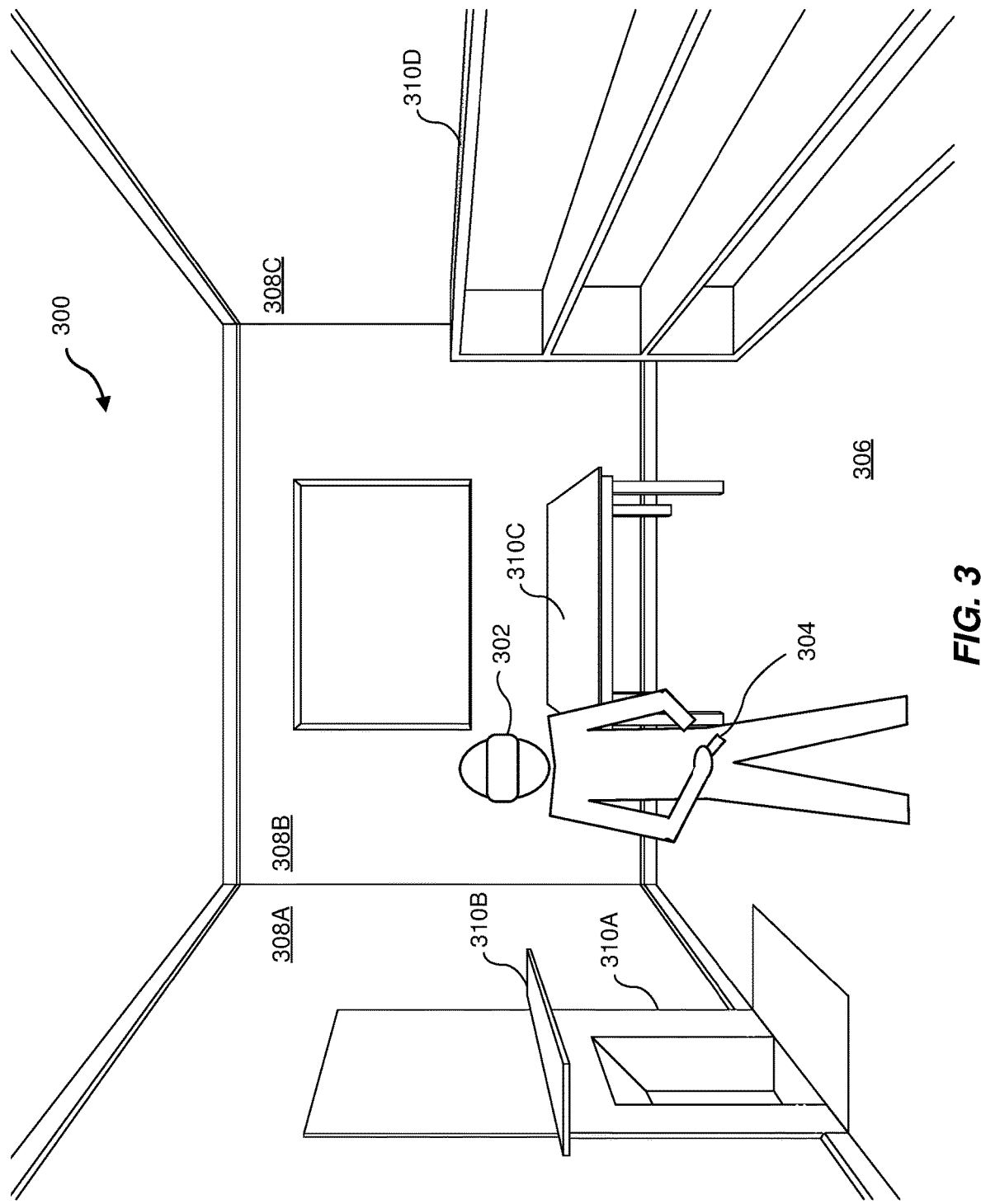
FIGS. 3 and 4 present a perspective view and a top view, respectively, of a user wearing an exemplary head-mounted display device and holding a hand-held controller in a real-world environment, according to some embodiments.
Figure 4:
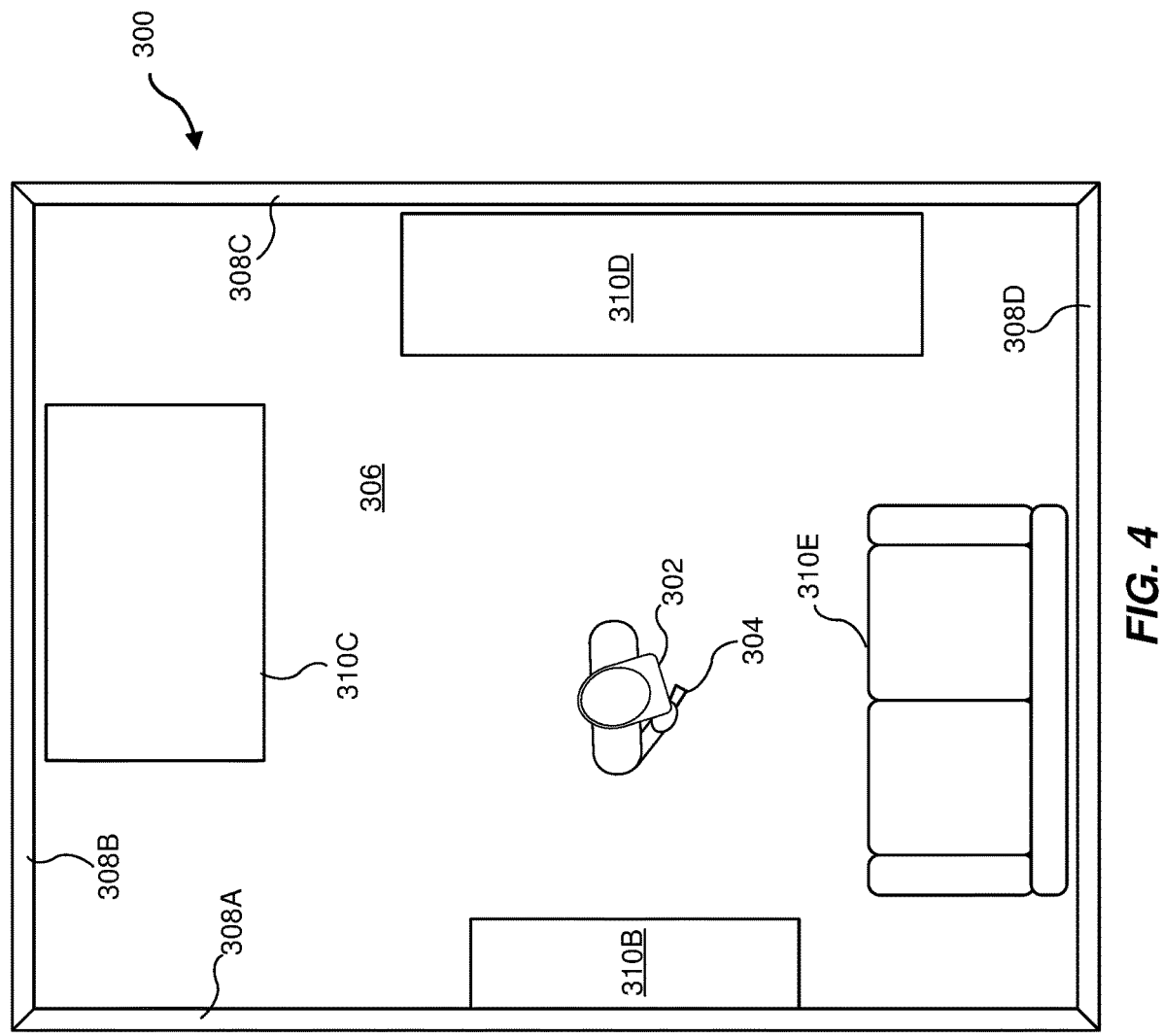

FIGS. 3 and 4 present a perspective view and a top view, respectively, of an exemplary real-world environment 300 in which a user wears an exemplary head-mounted display device 302 and holds a hand-held controller 304. Real-world environment 300 (e.g., a living room) may include a base plane 306, also referred to as a floor 306, and walls 308A, 308B, 308C, and 308D, collectively referred to as walls 308. Real-world environment 300 may further include a plurality of objects within the room that pose collision risks when the user's view is obstructed by exemplary real-world environment 300. For example, environment 300 may include a fireplace 310A having a protruding mantelpiece 310b, a table 310C, and shelves 310D. Environment 300 may further include a sofa 310E, as shown in FIG. 4. The objects and objects 310A, 310B, 310C, 310D, and 310E may be referred to, along with walls 304, as objects 310 of real-world environment 300.

In some embodiments, the user may move within real-world environment 300 in order to move within a virtual environment (e.g., virtual environment 1300 illustrated in FIG. 13) displayed in head-mounted display device 302. In other words, as the user moves within real-world environment 300, the images of a virtual environment shown in the head-mounted display device 302 may be correspondingly updated based on the user's movements. Accordingly, the user may move relative to the virtual environment as the user moves in real-world environment 300. As described in greater detail below, embodiments of the systems and methods described herein may enable the user to be made aware of objects in real-world environment 300 to enable the user to easily interact with the objects without having to remove head-mounted display device 302 and/or to prevent the user from colliding with any of the objects when the user cannot see real-world environment 300 (due to, e.g., obstruction of the user's real-world view by head-mounted display device 302).

Figure 5A:
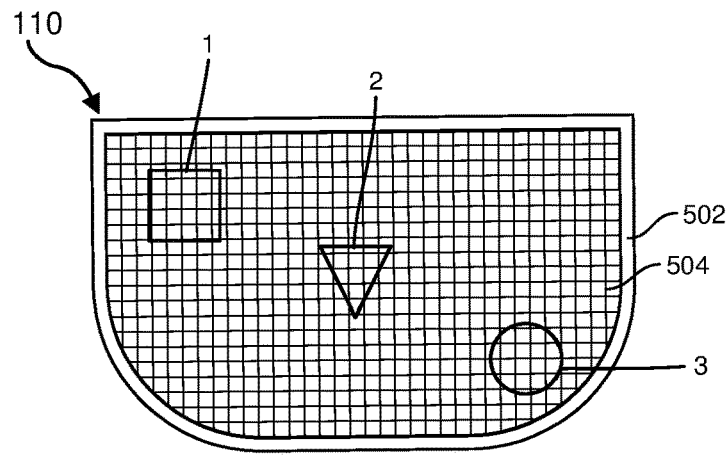
FIGS. 5A-5C depict an exemplary light-blocking device in a virtual-reality context in accordance with some embodiments.

FIG. 5A depicts an exemplary embodiment of light-blocking device 110. The figure shows light-blocking device 110 having a peripheral shape 502 that matches that of display 102. In some examples, light-blocking device 110 may be pixelated and may include a plurality of light-blocking pixels 504. In some examples, light-blocking device 110 may include a liquid crystal shutter, and light-blocking pixels 504 may be liquid-crystal pixels. In some examples, blocking pixels 504 may have a dimension appreciably larger than a corresponding dimension of pixels of display 102. In some examples, the pixel pitch of the blocking pixels may be approximately 1 mm. In some examples, light-blocking device 110 may include an optical shutter, and light-blocking pixels 504 may be electrically-controllable shutter pixels, which may be switched from a relatively light (or clear) state to a relatively dark state.

In some examples, light-blocking device 110 may be disposed within an artificial-reality headset. In a binocular device, there may be two light-blocking device 110s, one for the optical system corresponding to each eye. Light-blocking device 110 may be divided into regions, which may include one or more pixels, and the region and/or the pixels may be regular (e.g. square, rectangular, generally oval, or circular), irregular (such as a non-geometric shape, or a shape having a wavy or otherwise irregular edge). In some examples, each of blocking pixels 504 may be turned dark or clear independently of the rest. Regions of light-blocking device 110 may be electrically addressed using an addressing method, such as individually-addressed regions or matrix-addressed regions.

Figure 5B:
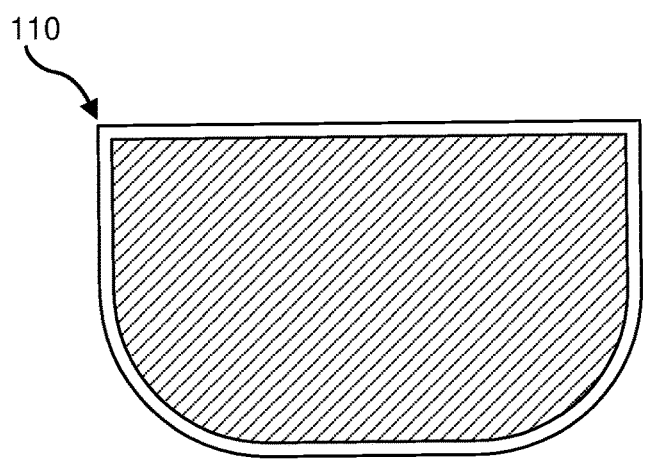
Figure 5C:
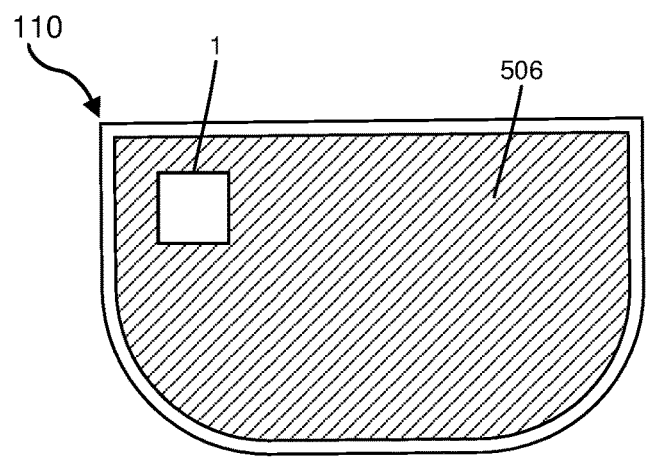

FIGS. 5A-5B illustrate light-blocking device 110 in a virtual-reality context where every region is generally used to display images 106. FIG. 5A illustrates light-blocking device 110 when each of light-blocking pixels 504 is in a pass-through state that allows light from objects 1, 2, and 3 to pass through light-blocking device 110. FIG. 5B illustrates light-blocking device 110 when each of light-blocking pixels 504 is in a blocking state that blocks light from objects 1, 2, and 3 from passing through light-blocking device 110. FIG. 5B may represent a state of light-blocking device 110 when a fully immersive virtual-reality scene is presented via display 102. FIG. 5C illustrates light-blocking device 110 when a portion 506 of light-blocking pixels 504 are in a blocking state that blocks light from objects 2 and 3 from passing through light-blocking device 110. In this example, the remaining light-blocking pixels 504 may be in a pass-through state that allows light from object 1 to pass through light-blocking device 110. FIG. 5C may represent a state of light-blocking device 110 when a virtual-reality scene is presented via display 102 but after a pass-through triggering event involving object 1 has been detected by pass-through subsystem 112.

Figure 6A:
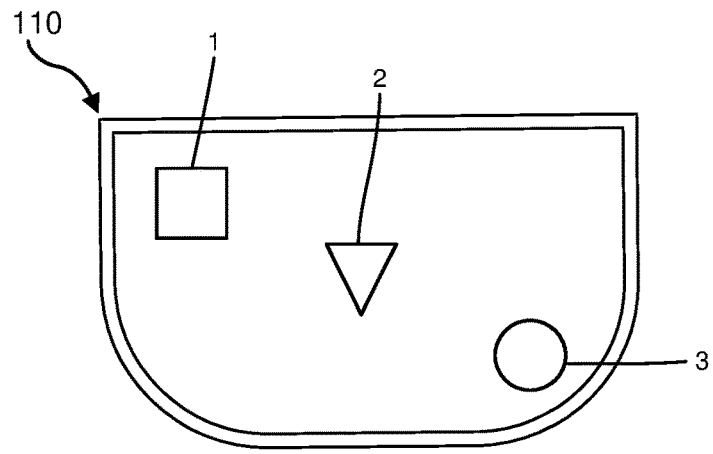
FIGS. 6A-6C depict an exemplary light-blocking device in an augmented-reality or mixed-reality context in accordance with some embodiments.
Figure 6B:
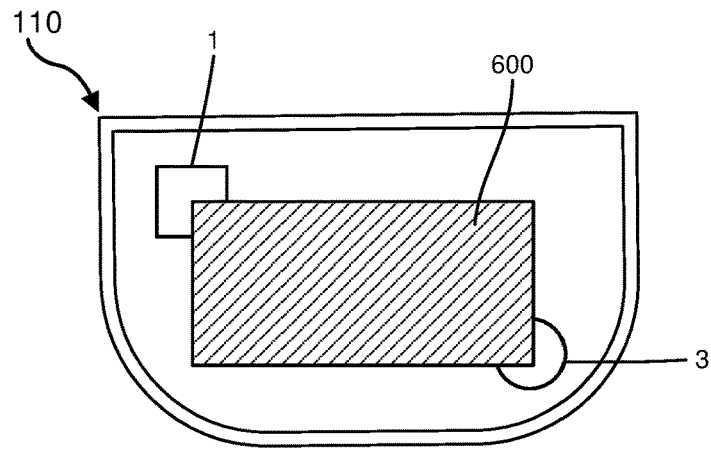
Figure 6C:
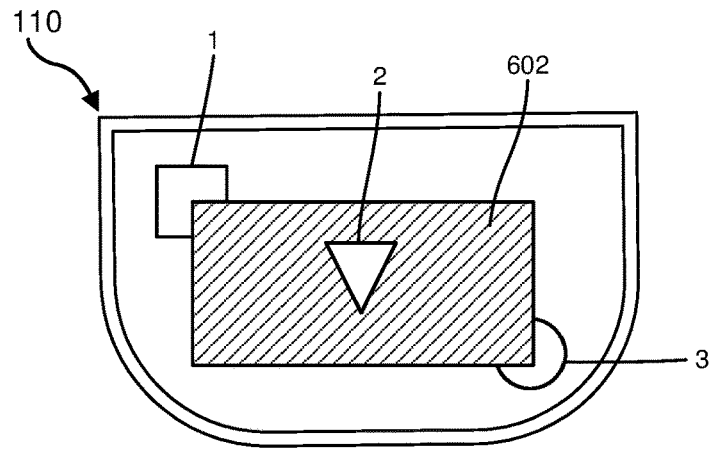

FIGS. 6A-6B illustrate light-blocking device 110 in an augmented-reality or mixed-reality context where only a portion of display 102 is used to display images 106. FIG. 6A illustrates light-blocking device 110 when each of light-blocking pixels 504 is in a pass-through state that allows light from objects 1, 2, and 3 to pass through light-blocking device 110. FIG. 6B illustrates light-blocking device 110 when a portion 600 of light-blocking pixels 504 are in a blocking state that blocks some light from objects 1 and 3 and all light from object 2 from passing through light-blocking device 110. FIG. 6B may illustrate a state of light-blocking device 110 when a graphic or virtual object is presented via a corresponding portion of display 102. FIG. 6C illustrates light-blocking device 110 when a different portion 602 of light-blocking pixels 504 are in a blocking state that blocks some of the light from objects 1 and 3 from passing through light-blocking device 110. In this example, the remaining portion of light-blocking pixels 504 may be in a pass-through state that allows light from object 2 to pass through light-blocking device 110. FIG. 6C may represent a state of light-blocking device 110 when a virtual-reality object is presented via display 102 but after a pass-through triggering event involving object 2 has been detected by pass-through subsystem 112.

Figure 7A:
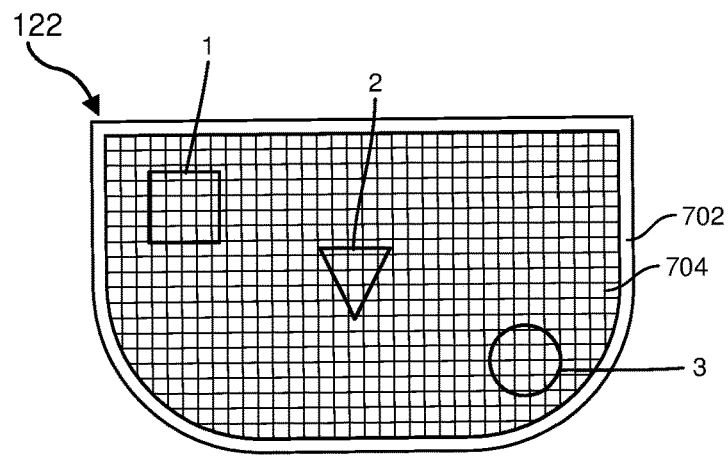
FIGS. 7A-7C depict an exemplary display for selectively augmenting artificial-reality experiences with digital views of real-world environments in accordance with some embodiments.

FIG. 7A depicts an exemplary embodiment of display 122. The figure shows display 122 having a peripheral shape 702. In some examples, display 122 may be pixelated and may include a plurality of light-emitting pixels 704. Display 122 may be disposed within an artificial-reality headset. In a binocular device, there may be two display 122s, one for the optical system corresponding to each eye. In some examples, each of light-emitting pixels 704 may display images 126 or real-world images 130 independently of the rest. Light-emitting pixels 704 of display 122 may be electrically addressed using an addressing method, such as individually-addressed regions or matrix-addressed regions.

Figure 7B:
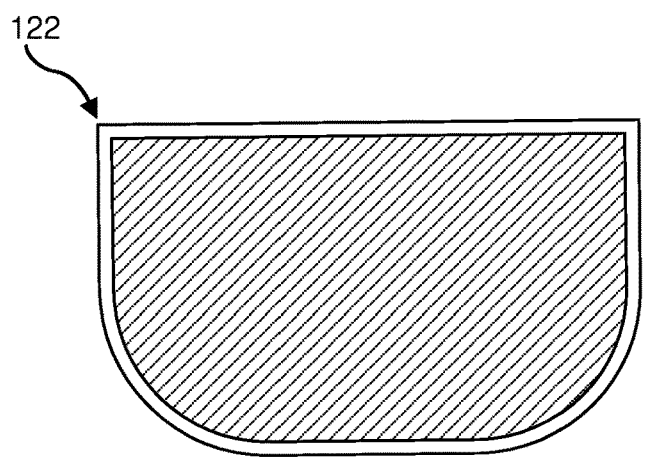
Figure 7C:
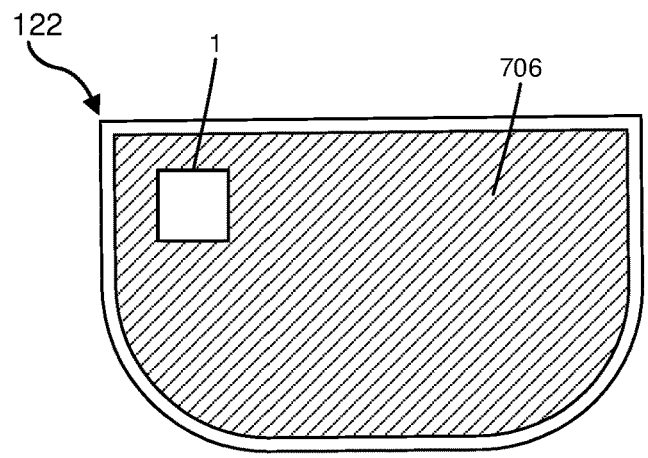

FIGS. 7A-7B illustrate display 122 in a virtual-reality context where every region is generally used to display images 126. FIG. 7A illustrates display 122 when each of light-emitting pixels 704 is in a pass-through state that displays light captured from objects 1, 2, and 3 by cameras 132. FIG. 7B illustrates display 122 when each of light-emitting pixels 704 is in a blocking state that displays images 126 rather than real-world images 130. FIG. 7B may represent a state of display 122 when a fully immersive virtual-reality scene is presented via display 122. FIG. 7C illustrates display 122 when a portion 706 of light-emitting pixels 704 are in a blocking state that blocks light from objects 2 and 3 from being digitally passed through display 122. In this example, the remaining light-emitting pixels 704 may be in a pass-through state that displays the portion of real-world images 130 containing object 1. FIG. 7C may represent a state of display 122 when a virtual-reality scene is presented via display 122 but after a pass-through triggering event involving object 1 has been detected by pass-through subsystem 122.

Figure 8A:
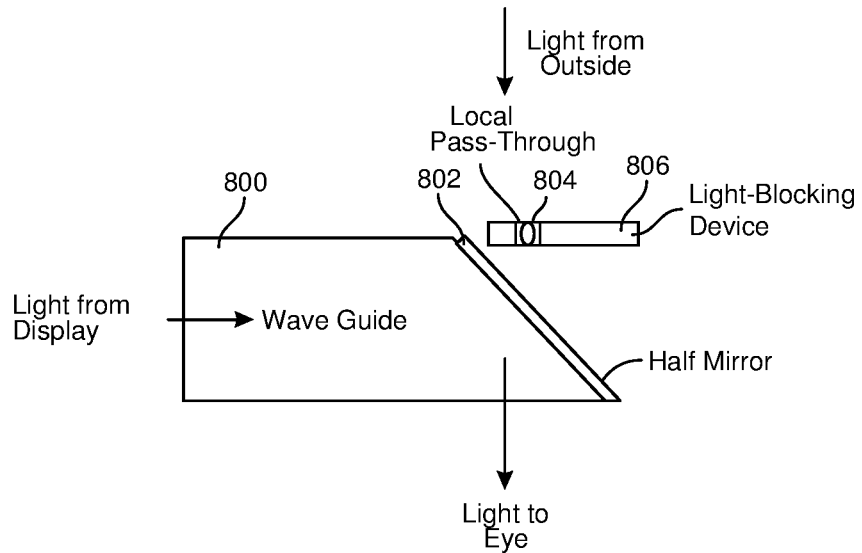
FIGS. 8A and 8B are block diagrams of exemplary waveguide display systems, according to some embodiments of this disclosure.
Figure 8B:
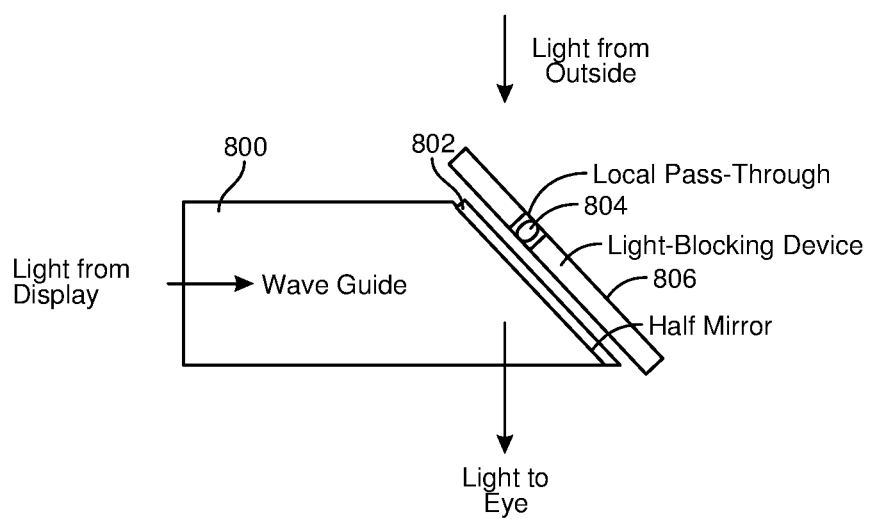

FIG. 8A shows a portion of an artificial-reality system, including a waveguide 800 configured to receive light from an artificial-reality display (such as an artificial-reality projection display) and a half-mirror 802 receiving light from the artificial-reality display through waveguide 800 and light from outside through a light-blocking device 806. A portion of light-blocking device denoted 804 may be relatively clear (transmissive) to pass through a portion of light from outside, which may be termed ambient light. The combination of the ambient light, and artificial-reality image elements provided through the waveguide, may be passed to the eye of a user to provide an artificial-reality image. The artificial-reality image may be a combination of the ambient image and any artificial-reality image element(s). There may be additional optical components, such as focusing lenses, that are not shown for clarity. FIG. 8B shows a portion of an artificial-reality system with similar components to FIG. 8A. In this configuration, light-blocking device 806 has an oblique arrangement proximate half-mirror 802. In some examples, a control system may be used to determine the correct portion of light-blocking device 806 to activate or reactivate (e.g., switch into a light or dark state) to provide localized light blocking or light transmittance.

Figure 9:
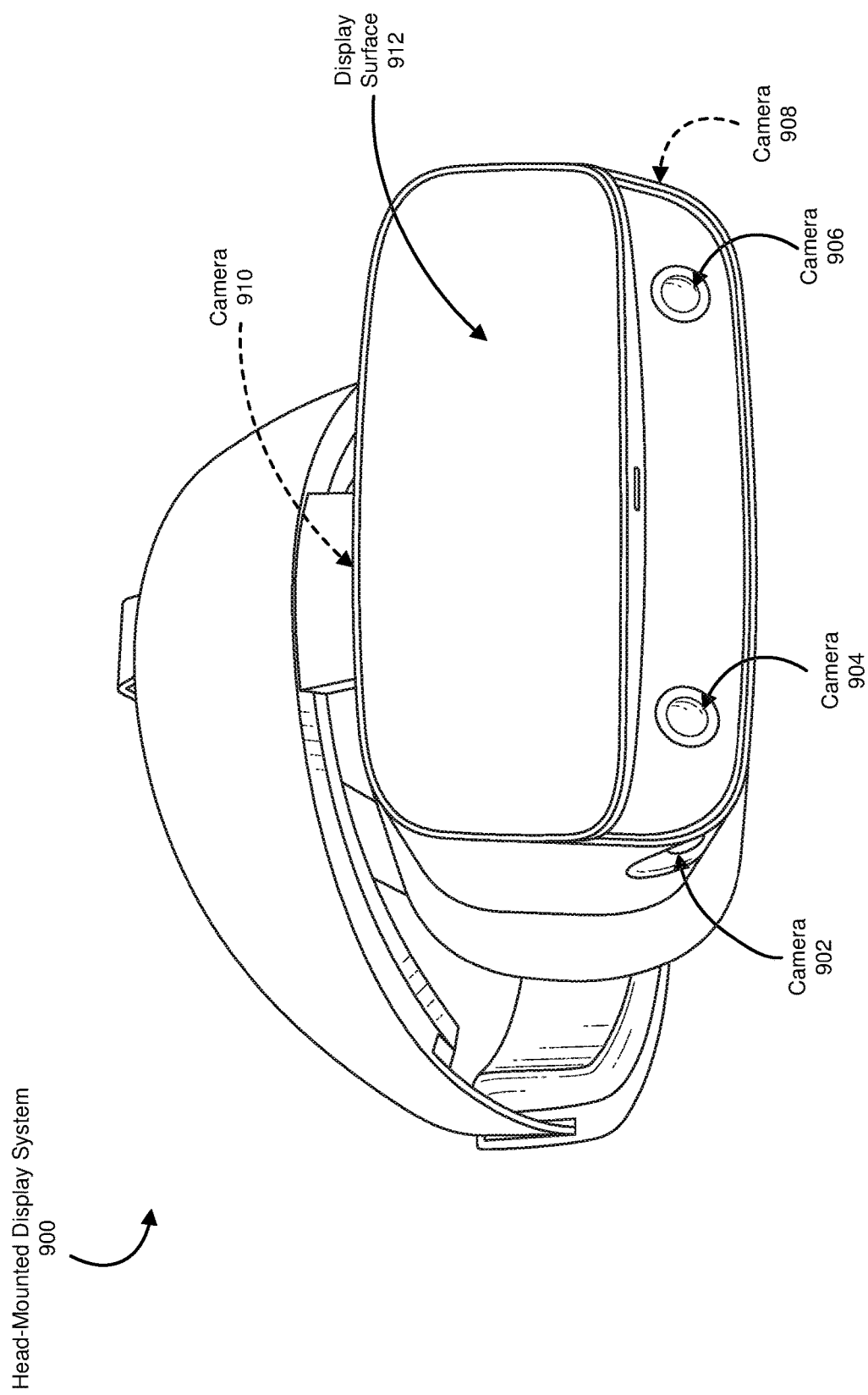
FIG. 9 is an illustration of an exemplary head-mounted display with multiple cameras.

FIG. 9 is an illustration of an exemplary head-mounted display that includes multiple cameras. In some embodiments, a head-mounted display 900 may include cameras 902, 904, 906, 908, and/or 910, and/or a display surface 912. In some embodiments, camera 902 may be mounted on the right surface of head-mounted display 900, camera 908 may be mounted on the left surface of head-mounted display 900, camera 904 may be mounted on the right side of the front, camera 906 may be mounted on the left side of the front, and/or camera 910 may be mounted centrally on the front of head-mounted display 900. In some embodiments, cameras 902, 904, 906, and/or 908 may be mounted on rigid mounting points while camera 910 may be mounted on a non-rigid mounting point. In one embodiment, cameras 902, 904, 906, and/or 908 may be mounted to a metal bracket set within head-mounted display 900.

In some embodiments, cameras 902, 904, 906, 908, and/or 910 may each be mounted flush with surfaces of head-mounted display 900 (rather than protruding from head-mounted display 900). In one embodiment, camera 902 may be located behind camera 904 (relative to the front of head-mounted display 900) and/or may be angled at a downward angle, such as 45° downward. In some embodiments, camera 902 may be located at a different downward angle, such as 30°, 60°, or any other appropriate angle. Similarly, camera 908 may be located behind camera 906 and/or may be angled at a downward angle. In some embodiments, cameras 904, 906, and 910 may all be mounted on the same surface of the head-mounted display. In other embodiments, cameras 904 and/or 906 may be mounted on one front surface of the head-mounted display while camera 910 may be mounted on a separate front surface of the head-mounted display. In some examples, cameras 902, 904, 906, 908, and/or 910 may be may be used to capture a digital view (e.g., a 2D or 3D view) of a user's real-world environment. In some examples, display surface 912 may be opaque to visible light, preventing the user from a direct view of the real-world environment. Alternatively, display surface 912 may be at least partially transparent to visible light (i.e., light having a wavelength of about 380 nm to about 750 nm) and may allow light to pass through to an underlying display. In some embodiments, display surface 912 may be a display or a light-blocking device.

Figure 10:
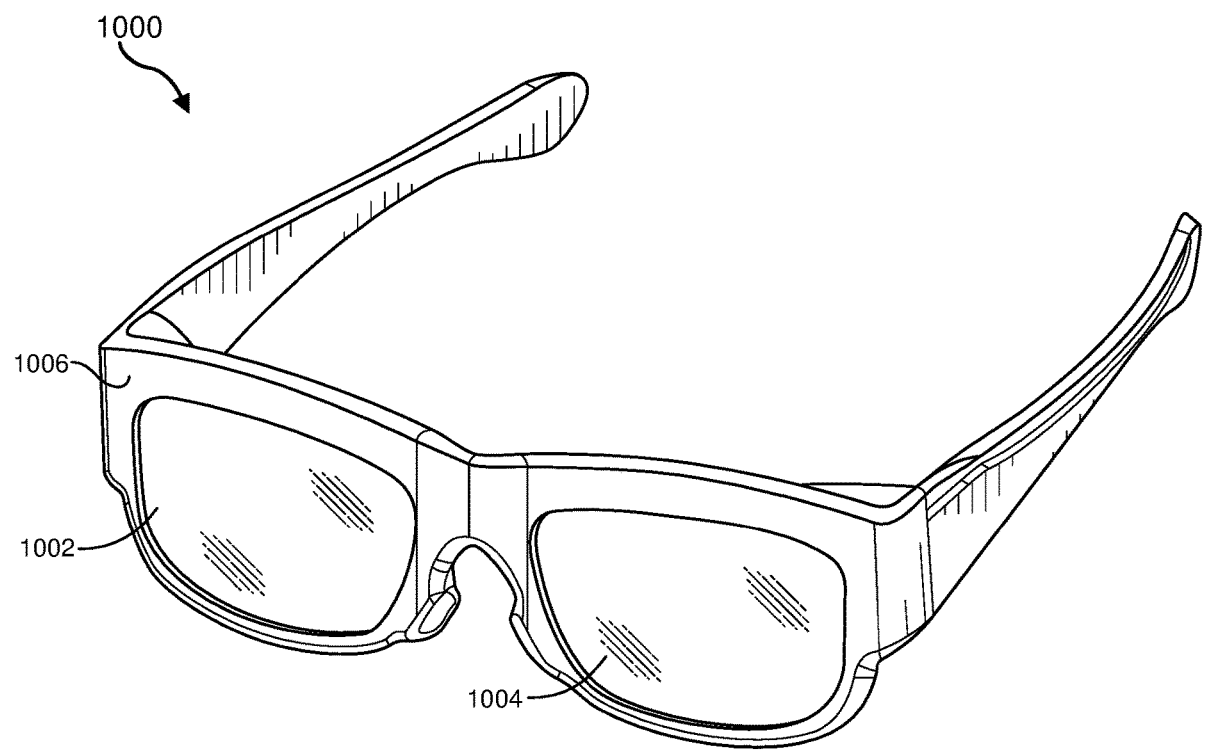
FIG. 10 is an illustration of another exemplary head-mounted display.

FIG. 10 shows an example head-mounted display device, in this example augmented reality glasses 1000, which may include first and second light-blocking elements in respective lenses (or respective windows), such as lenses 1002 and 1004. In some examples, the light-blocking elements may have an outside peripheral shape conforming to the interior of a lens-holding portion of the frame 1006. In some embodiments, the term lens may be used for plane windows used to allow light to ingress or egress from a device.

Figure 11:
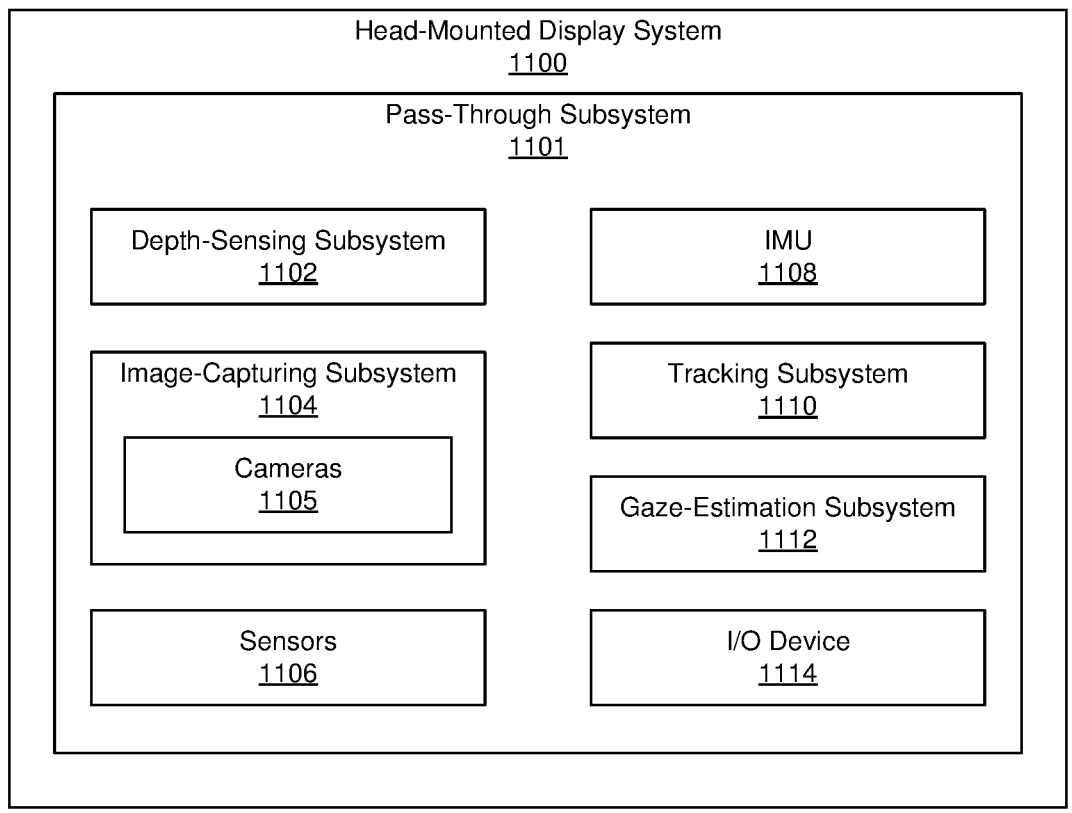
FIG. 11 is a block diagram of an exemplary pass-through subsystem for selectively augmenting artificial-reality experiences with views of real-world environments according to some embodiments of this disclosure.

FIG. 11 illustrates an exemplary configuration of a pass-through subsystem 1101 of a head-mounted display system 1100. Pass-through subsystem 1101 may detect pass-through triggering events in a user's environment and/or may control how ambient light from objects in the user's real-world environment is allowed to pass through a pass-through display of head-mounted display system 1100 to the user. In some examples, pass-through subsystem 1101 may include a depth-sensing subsystem 1102 (or depth camera system), an image-capturing subsystem 1104, one or more additional sensors 1106 (e.g., position sensors, audio sensors, etc.), and/or an inertial measurement unit (IMU) 1108. One or more of these components may provide a tracking subsystem 1110 of pass-through subsystem 1101 information that can be used to identify and track objects in a real-world environment and/or determine the position of head-mounted display system 1100 relative to the real-world environment. Other embodiments of pass-through subsystem 1101 may also include a gaze-estimation subsystem 1112 configured to track a user's eyes relative to a display of head-mounted display system 1100 and/or objects in the real-world environment. Pass-through subsystem 1101 may also include an I/O device 1114 for receiving input from a user. Some embodiments of pass-through subsystem 1101 may have different components than those described in conjunction with FIG. 11.

In some examples, depth-sensing subsystem 1102 may capture data describing depth information characterizing a real-world environment surrounding some or all of head-mounted display system 1100. In some embodiments, depth-sensing subsystem 1102 may characterize a position or velocity of head-mounted display system 1100 and/or objects within the real-world environment. Depth-sensing subsystem 1102 may compute a depth map using collected data (e.g., based on a captured light according to one or more computer-vision schemes or algorithms, by processing a portion of a structured light pattern, by time-of-flight (ToF) imaging, simultaneous localization and mapping (SLAM), etc.). In some examples, the depth maps may be used to generate a model of the real-world environment surrounding head-mounted display system 1100. Accordingly, depth-sensing subsystem 1102 may be referred to as a localization and modeling subsystem or may be a part of such a subsystem.

In some examples, image-capturing subsystem 1104 may include one or more optical image sensors or cameras 1105 that capture and collect image data from a user's real-world environment. In some embodiments, cameras 1105 may provide stereoscopic views of a user's real-world environment that may be used by tracking subsystem 1110 to identify and track real-world objects. In some embodiments, the image data may be processed by tracking subsystem 1110 or another component of image-capturing subsystem 1104 to generate a three-dimensional model of the user's real-world environment and the objects contained therein. In some examples, image-capturing subsystem 1104 may include simultaneous localization and mapping (SLAM) cameras or other cameras that include a wide-angle lens system that captures a wider field-of-view than may be captured by the eyes of the user.

In some examples, IMU 1108 may generate data indicating a position and/or orientation of head-mounted display system 1100 based on measurement signals received from one or more of sensors 1106 and from depth information received from depth-sensing subsystem 1102 and/or image-capturing subsystem 1104. For example, sensors 1106 may generate one or more measurement signals in response to motion of head-mounted display system 1100. Examples of sensors 1106 include one or more accelerometers, one or more gyroscopes, one or more magnetometers, another suitable type of sensor that detects motion, a type of sensor used for error correction of IMU 1108, or some combination thereof. Based on the one or more measurement signals from one or more of position sensors 1106, IMU 1108 may generate data indicating an estimated current position, elevation, and/or orientation of head-mounted display system 1100 relative to an initial position and/or orientation of head-mounted display system 1100. For example, sensors 1106 may include multiple accelerometers to measure translational motion (forward/back, up/down, left/right) and multiple gyroscopes to measure rotational motion (e.g., pitch, yaw, roll). As described herein, image-capturing subsystem 1104 and/or depth-sensing subsystem 1102 may generate data indicating an estimated current position and/or orientation of head-mounted display system 1100 relative to the real-world environment in which head-mounted display is used.

Tracking subsystem 1110 may include one or more processing devices or physical processors that (1) identifies and tracks objects in a user's real-world environment and (2) detects pass-through triggering events involving the objects in accordance with information received from one or more of depth-sensing subsystem 1102, image-capturing subsystem 1104, sensors 1106, IMU 1108, and gaze-estimation subsystem 1112. In some embodiments, tracking subsystem 1110 may monitor real-world objects that can be observed by depth-sensing subsystem 1102, image-capturing subsystem 1104, and/or by another system. Tracking subsystem 1110 may also receive information from one or more eye-tracking cameras included in some embodiments of pass-through subsystem 1101 to track a user's gaze. In some examples, a user's gaze angle may inform pass-through subsystem 1101 of which part of a light-blocking device that should pass through light and which part should block light. Additionally, a user's gaze angle may inform pass-through subsystem 1101 of the user's intentions.

Figure 12:
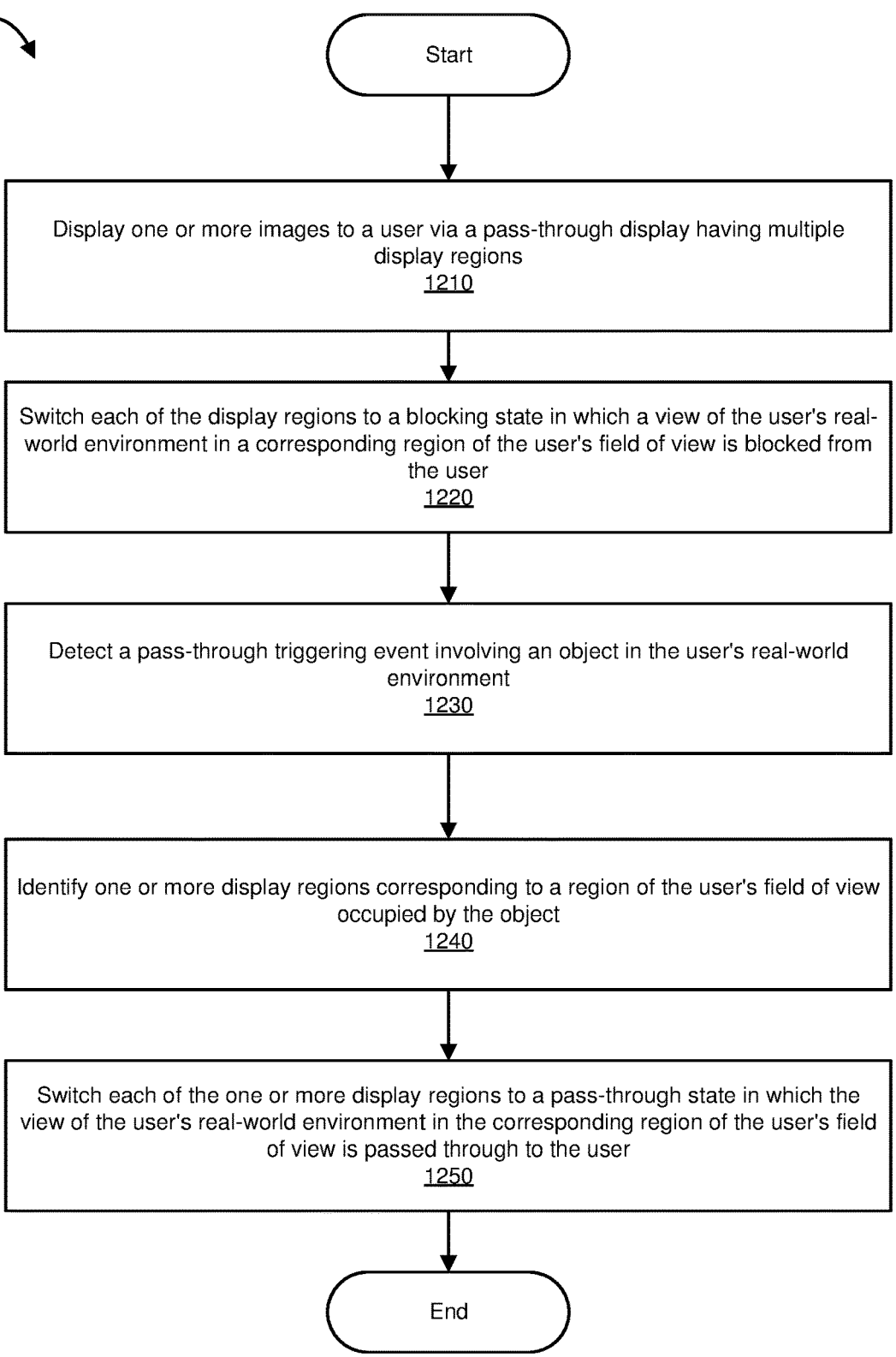
FIG. 12 is a flow diagram of an exemplary method for selectively augmenting artificial-reality experiences with optical or digital views of real-world environments, in accordance with some embodiments.

FIG. 12 is a flow diagram of an exemplary computer-implemented method 1200 for selectively augmenting artificial-reality experiences with optical or digital views of real-world environments. The steps shown in FIG. 12 may be performed by any suitable computer-executable code and/or computing system, including the system(s) illustrated in FIGS. 1A and 1B. In one example, each of the steps shown in FIG. 12 may represent an algorithm whose structure includes and/or is represented by multiple sub-steps, examples of which will be provided in greater detail below.

As illustrated in FIG. 12, at step 1210 one or more of the systems described herein may display one or more images to a user via a pass-through display having multiple display regions. For example, display subsystem 104 may display images 106 to a user of display system 100 via display 102 and light-blocking device 110. In another example, pass-through subsystem 124 may display images 126 to a user of display system 120 via display 122.

In some embodiments, a pass-through display may be (1) a transparent display capable of displaying images and transmitting ambient light from a real-world environment and (2) a corresponding light-blocking device capable of controlling the amount of ambient light from the real-world environment that can pass through the transparent display. For example, display 102 and light-blocking device 110 may collectively make up a single pass-through display. In these examples, a display region may be the corresponding or matching portions of each of a display and a light blocking device. In other embodiments, a pass-through display may be an opaque display or a display through which ambient light is unable to travel.

The systems described herein may perform step 1210 in a variety of ways. In some examples, one or more of the virtual-reality systems described herein may display one or more images to a user via each and every display region of a display (e.g., as described in connection with FIGS. 5A-5C or FIGS. 7A-7C). In other examples, one or more of the augmented-reality or mixed reality systems described herein may display one or more images to a user via less than every display region of a display (e.g., as described in connection with FIGS. 6A-6C).

At step 1220, one or more of the systems described herein may switch each of the display regions of the pass-through display to a blocking state in which a digital or optical view of the user's real-world environment in a corresponding region of the user's field of view is blocked from the user. For example, pass-through subsystem 110 may switch each of light-blocking pixels 504 to a blocking state, as shown in FIG. 5B. In another example, pass-through subsystem 110 may switch each of light-blocking pixels 504 in portion 502 to a blocking state, as shown in FIG. 6B. In yet another example of step 1220, pass-through subsystem 124 may switch each of display pixels 704 to a blocking state, as shown in FIG. 7B.

Figure 13:
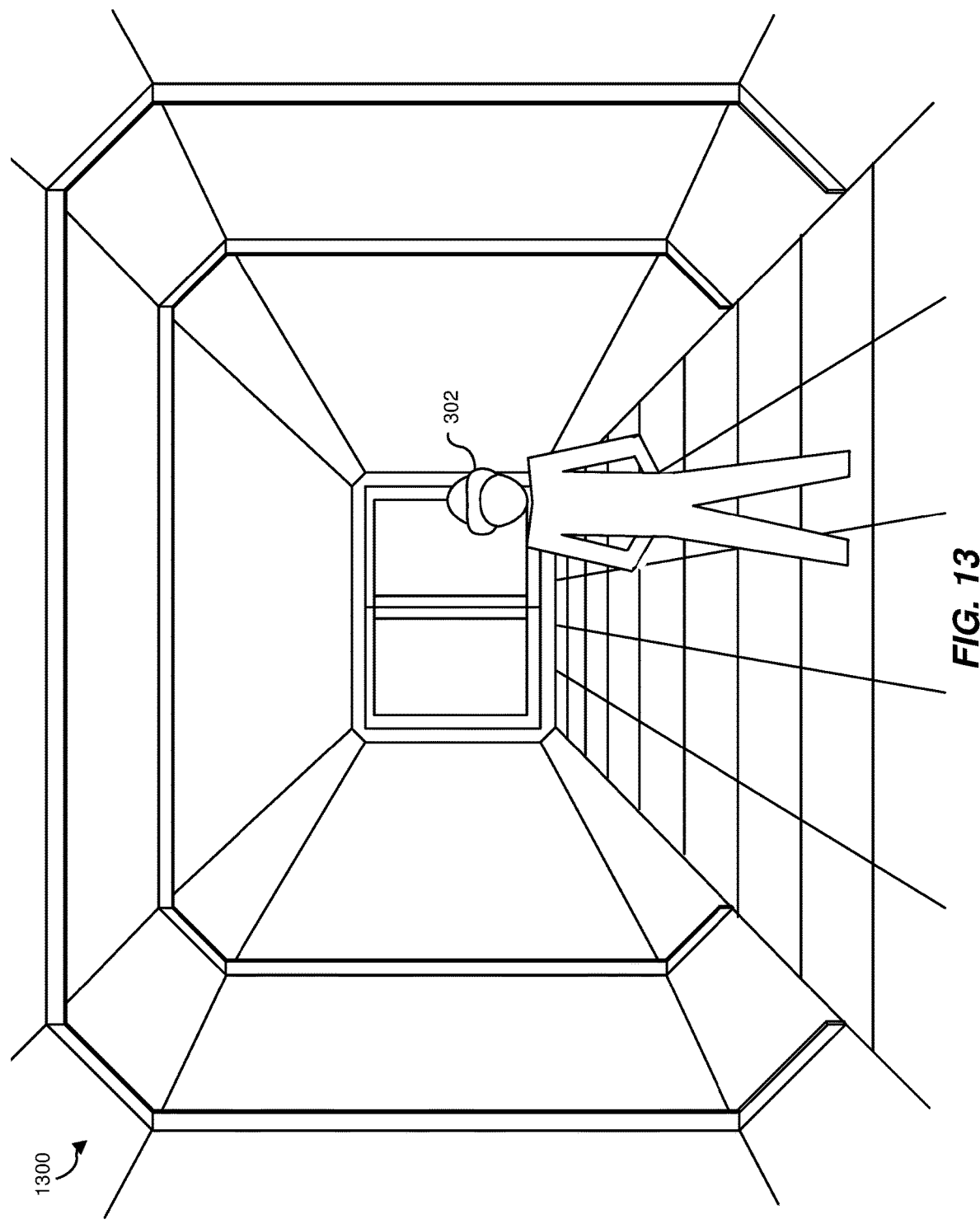
FIGS. 13 and 14 present perspective views of the user of FIG. 3 interacting with a virtual environment while located in the real-world environment of FIG. 3, according to some embodiments.
Figure 14:
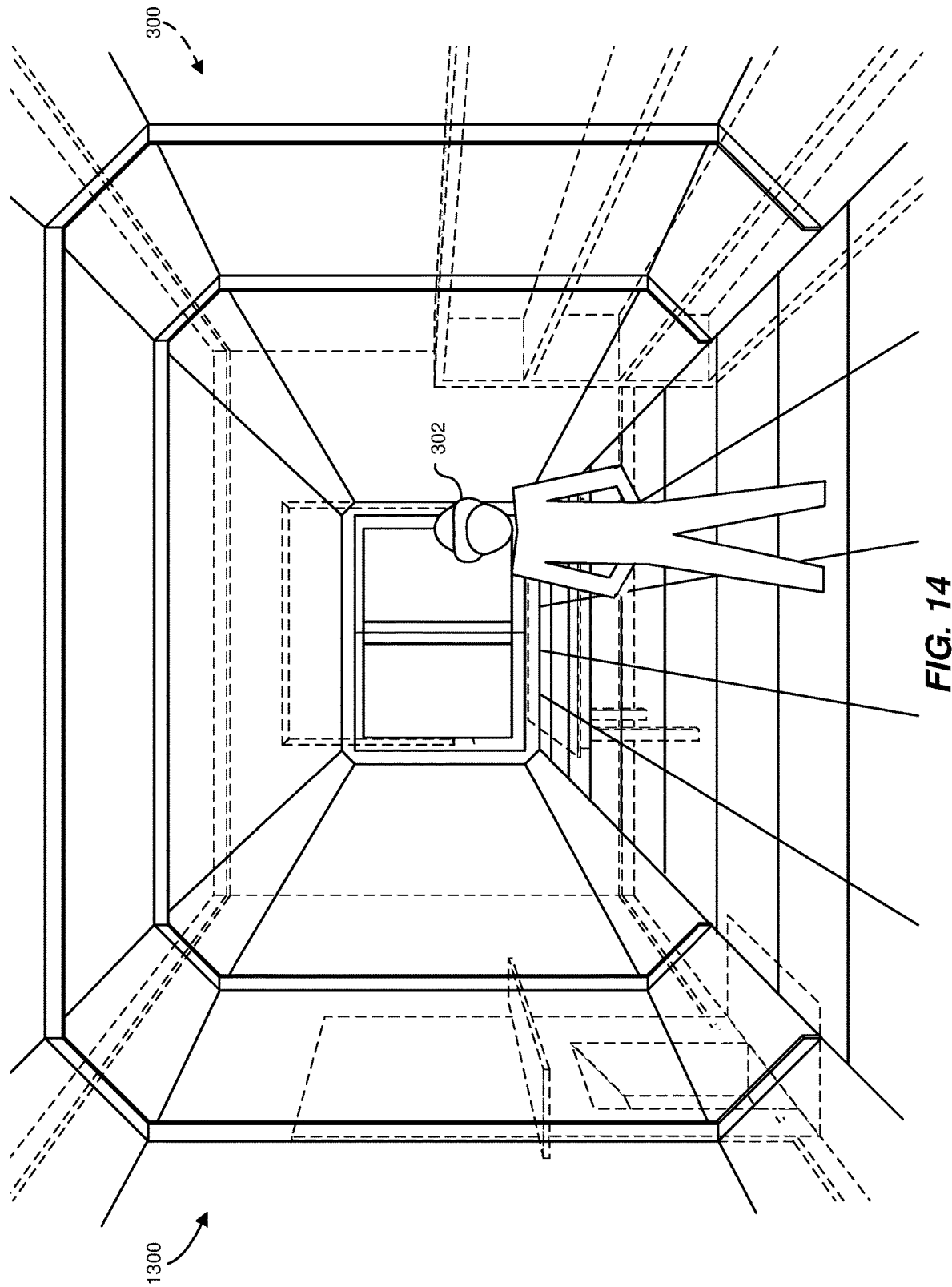

FIGS. 13 and 14 illustrate an exemplary immersive virtual environment 1300 that may be displayed to a user via a head-mounted display device 302 while the user is located within real-world environment 300. In the examples shown in FIGS. 13 and 14, the user may be fully immersed in virtual environment 1300 and may be unable to see any of real-world environment 300. In this state, each display region of the pass-through display of head-mounted display device 302 may be in a blocking state, and the user's field of view may initially be field of view 2200 illustrated in FIG. 22.

At step 1230, one or more of the systems described herein may detect a pass-through triggering event involving an object in the user's real-world environment. For example, pass-through subsystem 110 or 124 may detect a pass-through triggering event involving one or more of objects 1-3 in real-world environment 200.

The systems described herein may detect various types of pass-through triggering events. For example, the systems described herein may consider the presence of a particular object or a particular type of object in a user's field of view as a pass-through triggering event. In some examples, a user may have previously indicated a particular object or a particular type of object that should always be passed through to the user. In other examples, application or safety criteria may indicate a particular object or a particular type of object or hazard that should always be passed through to the user.

In some examples, the systems described herein may consider the occurrence of a particular situation or the occurrence of a particular type of situation as a pass-through triggering event. For example, the systems described herein may consider the appearance of a person or animal in a user's real-world environment as a pass-through triggering event involving the person or animal. In other examples, the systems described herein may consider the presence of an object within a certain distance from a user as a pass-through triggering event involving the person or animal.

In some examples, the systems described herein may consider certain motions or velocities of objects as pass-through triggering events involving the objects. For example, the systems described herein may consider an object having a velocity above a predetermined threshold as a pass-through triggering event involving the object. In other examples, the systems described herein may consider an object having a velocity in the direction of a user as a pass-through triggering event involving the object.

In some examples, the systems described herein may consider the presence or appearance of a person or animal in a user's real-world environment as a pass-through triggering event involving the person or animal. Using FIG. 23 as an example, the systems described herein may consider the appearance of person 2300 in real-world environment 300 as a pass-through triggering event. Alternatively, the systems described herein may consider the appearance of person 2300 in zone 2302 of real-world environment 300 as a pass-through triggering event.

In some examples, the systems described herein may consider a particular action by an object as a pass-through triggering event involving the object. For example, the systems described herein may consider a sound emitted by a phone as a pass-through triggering event involving the phone. In some examples, the systems described herein may consider certain actions by a user or a third-party individual as a pass-through triggering event, especially actions that may indicate the user's or the third-party individual's intentions to interact. For example, the systems described herein may consider a user's reach for or in the direction of a real-world object as a pass-through triggering event involving the real-world object. Using FIG. 21 as an example, the systems described herein may consider reach 2100 of hand 1504 towards a controller 2102 as a pass-through triggering event involving controller 2102. In another example, the systems described herein may consider a change of a user's gaze, head pose, or body pose in the direction of a real-world object as a pass-through triggering event involving the real-world object. Using FIG. 21 as another example, the systems described herein may consider tilt 2104 of head 2106 towards controller 2102 as a pass-through triggering event involving controller 2102. Additionally, the systems described herein may consider a change of a third-party individual's gaze, head pose, or body pose in the direction of the user as a pass-through triggering event involving the third-party individual. In some examples, the systems described herein may consider a start of a conversation between a user and a third-party individual as a pass-through triggering event involving the third-party individual.

In some examples, the systems described herein may monitor a user's interactions with a virtual object in a virtual environment and may determine that the user wishes to interact with an object in a real-world environment by detecting an action by the user that is less likely to directed to the virtual object and/or more likely to be directed to the real-world object. For example, if a user reaches in the direction of a real-world object and no virtual object is within the reach of the user in a virtual environment, the systems described herein may determine that the user intends to interact with the real-world object. Likewise, if a user looks in the direction of a real-world object and no virtual object is located in the same direction of a virtual environment, the systems described herein may determine that the user intends to interact with the real-world object.

In some examples, the systems described herein may consider certain predetermined voice-based or gesture-based commands or requests as a pass-through triggering event. For example, the systems described herein may consider a command to "show" or "pass through" an object or a type of object as a pass-through triggering event. Additionally, the systems described herein may consider a gesture such as a finger pointed or a head nodded towards an object as a pass-through triggering event involving the object.

In some embodiments, the systems described herein may learn what situations or actions indicate or precede a user's interaction with an object in the user's real-world environment and may later consider the occurrence of such situations or actions as pass-through triggering events involving the object. For example, if a user interacts with his or her phone after the phone emits a particular sound, the systems described herein may consider an emittance of the sound by the phone as a pass-through triggering event involving the phone.

Figure 15:
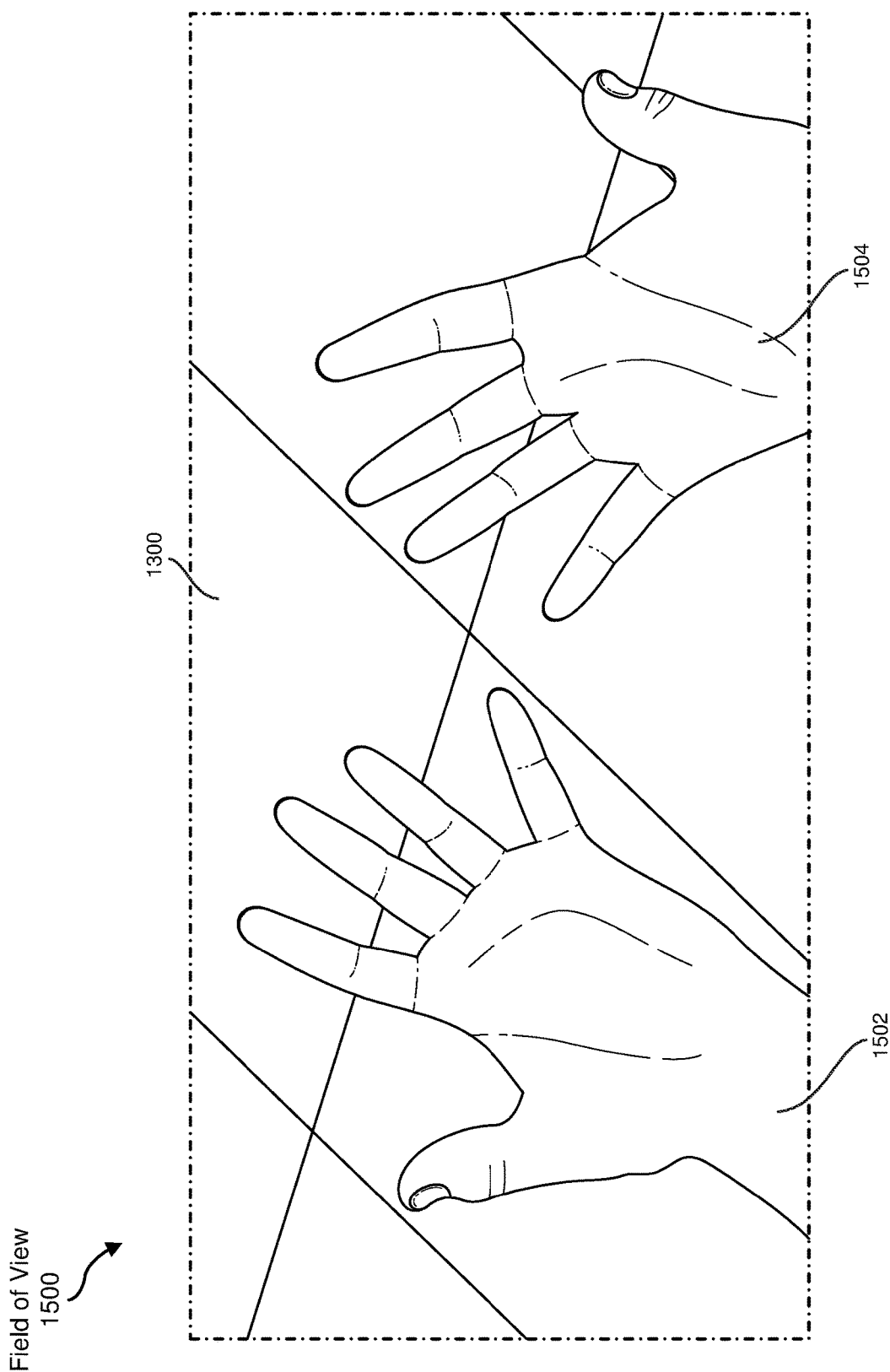
FIGS. 15 and 16 are illustrations of a user's field of view while the user wears a head-mounted display system, according to some embodiments of the present disclosure.
Figure 16:
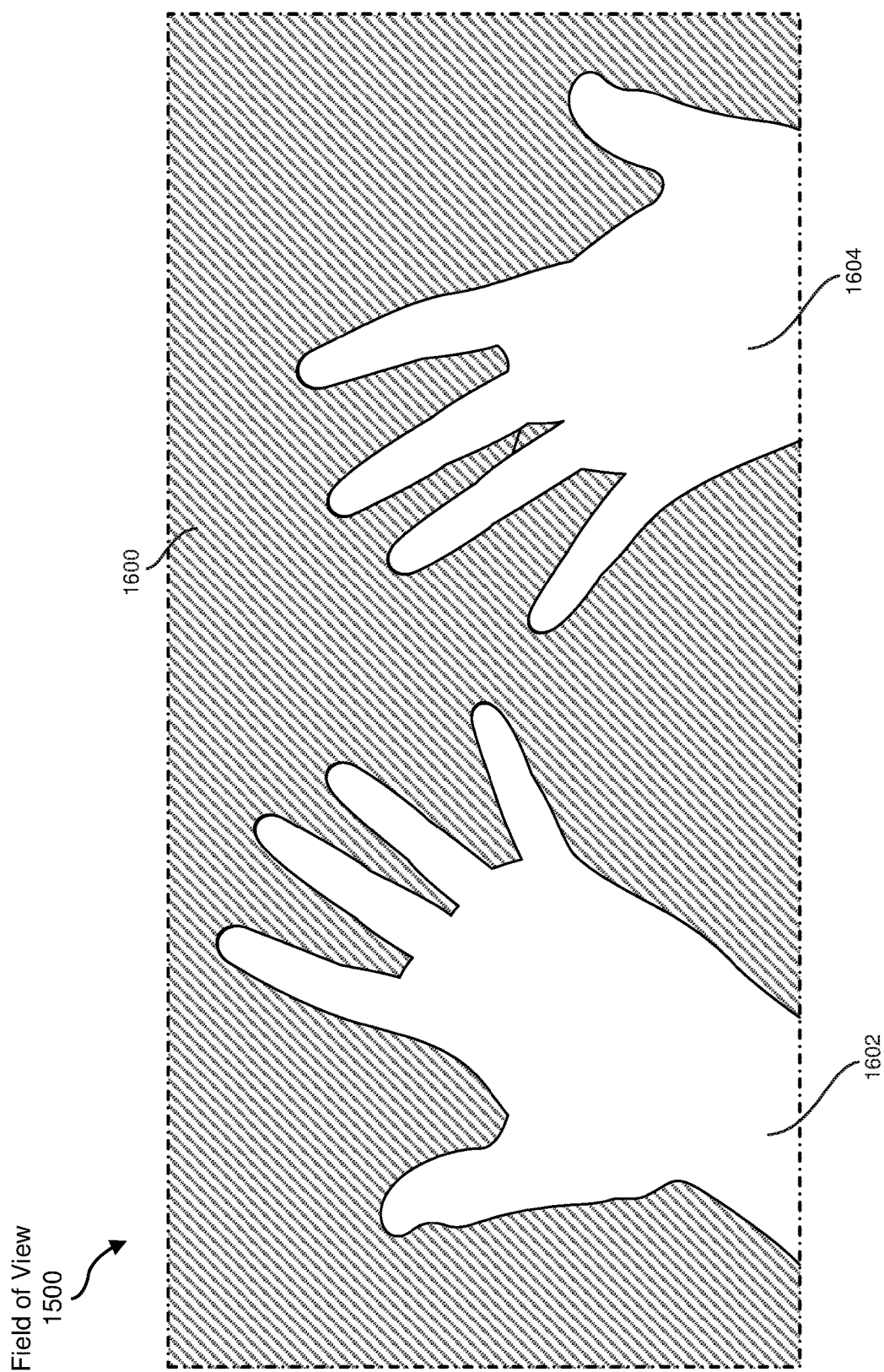
Figure 17:
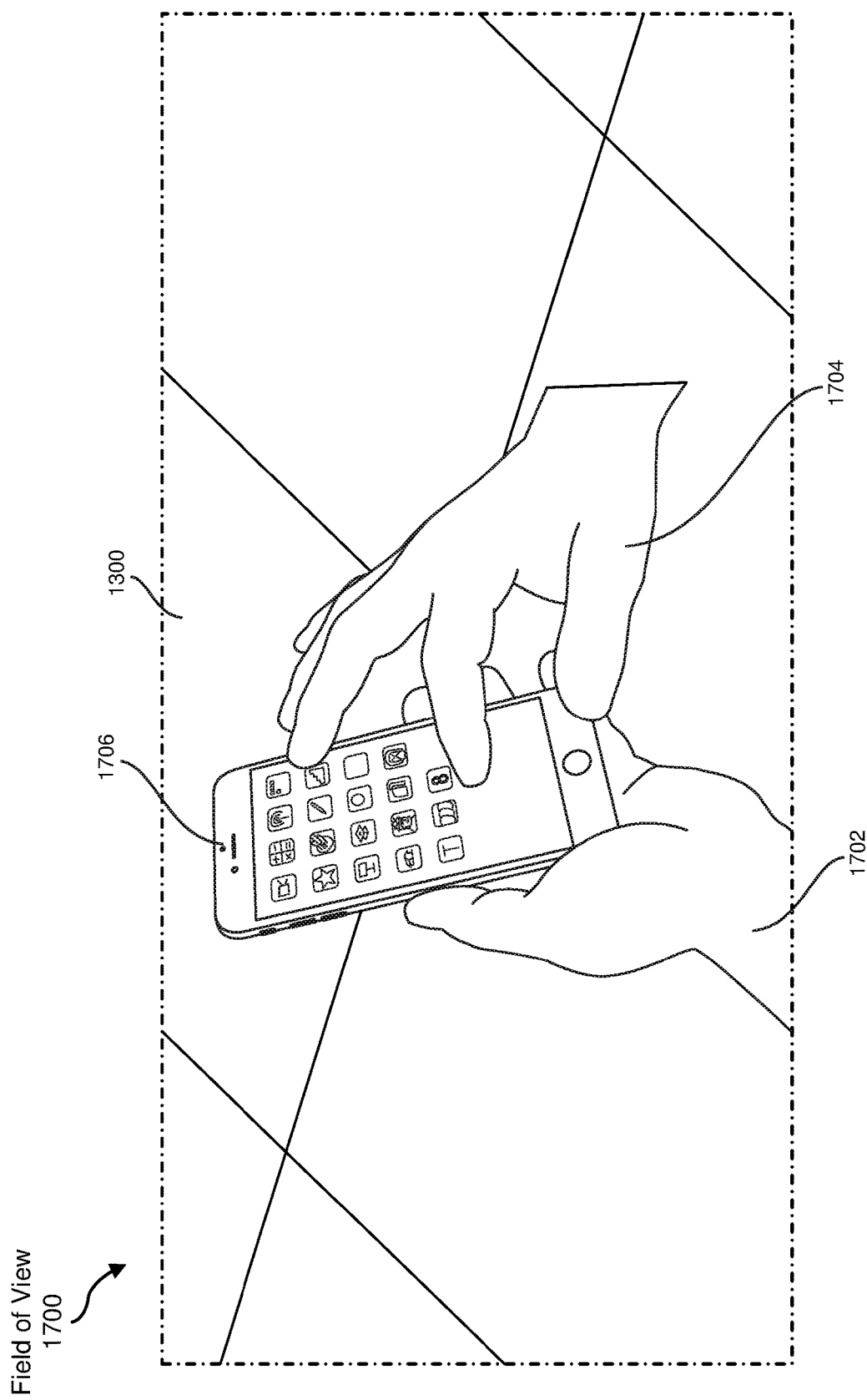
FIGS. 17 and 18 are illustrations of a user's field of view while the user wears a head-mounted display system, according to some embodiments of the present disclosure.
Figure 18:
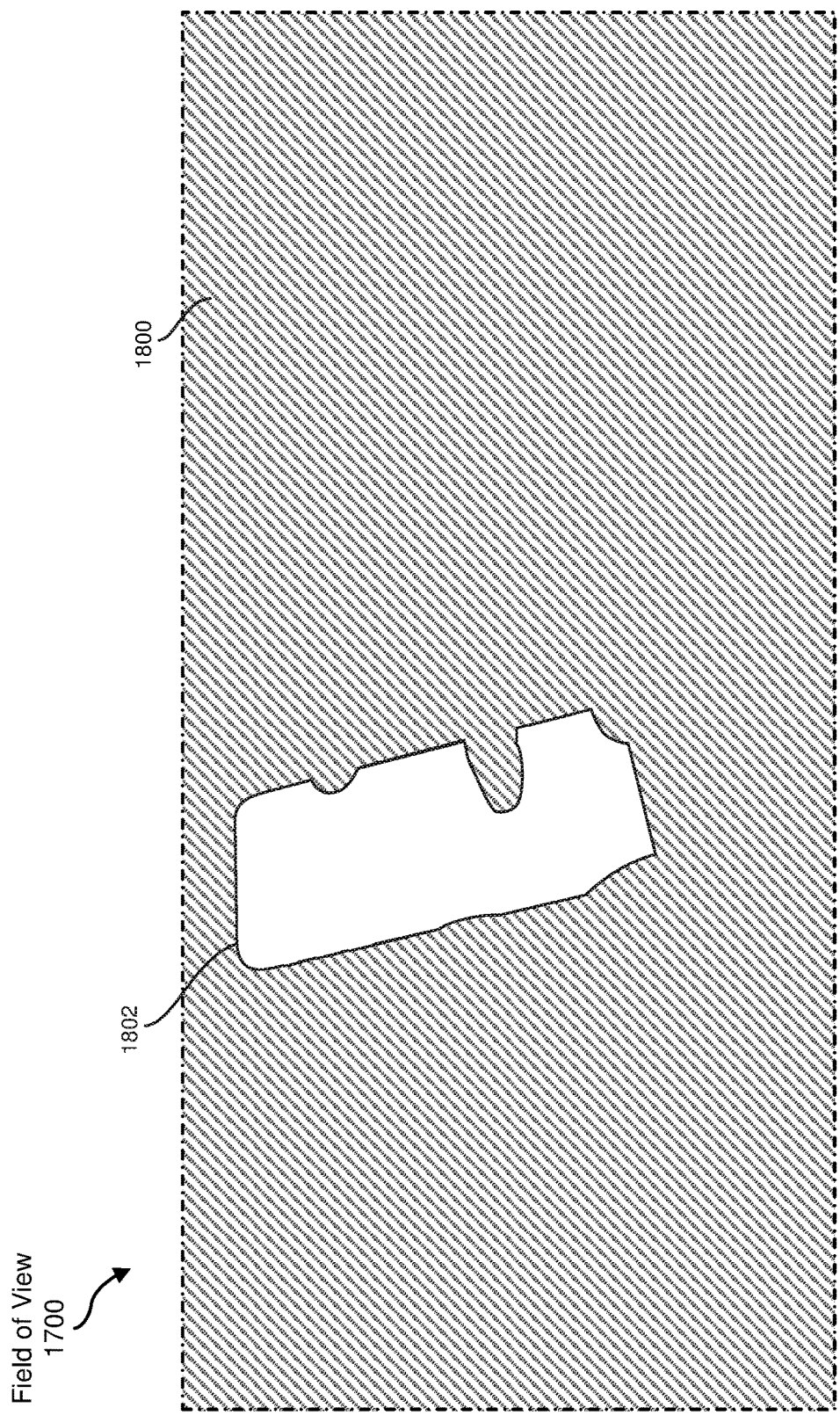
Figure 19:
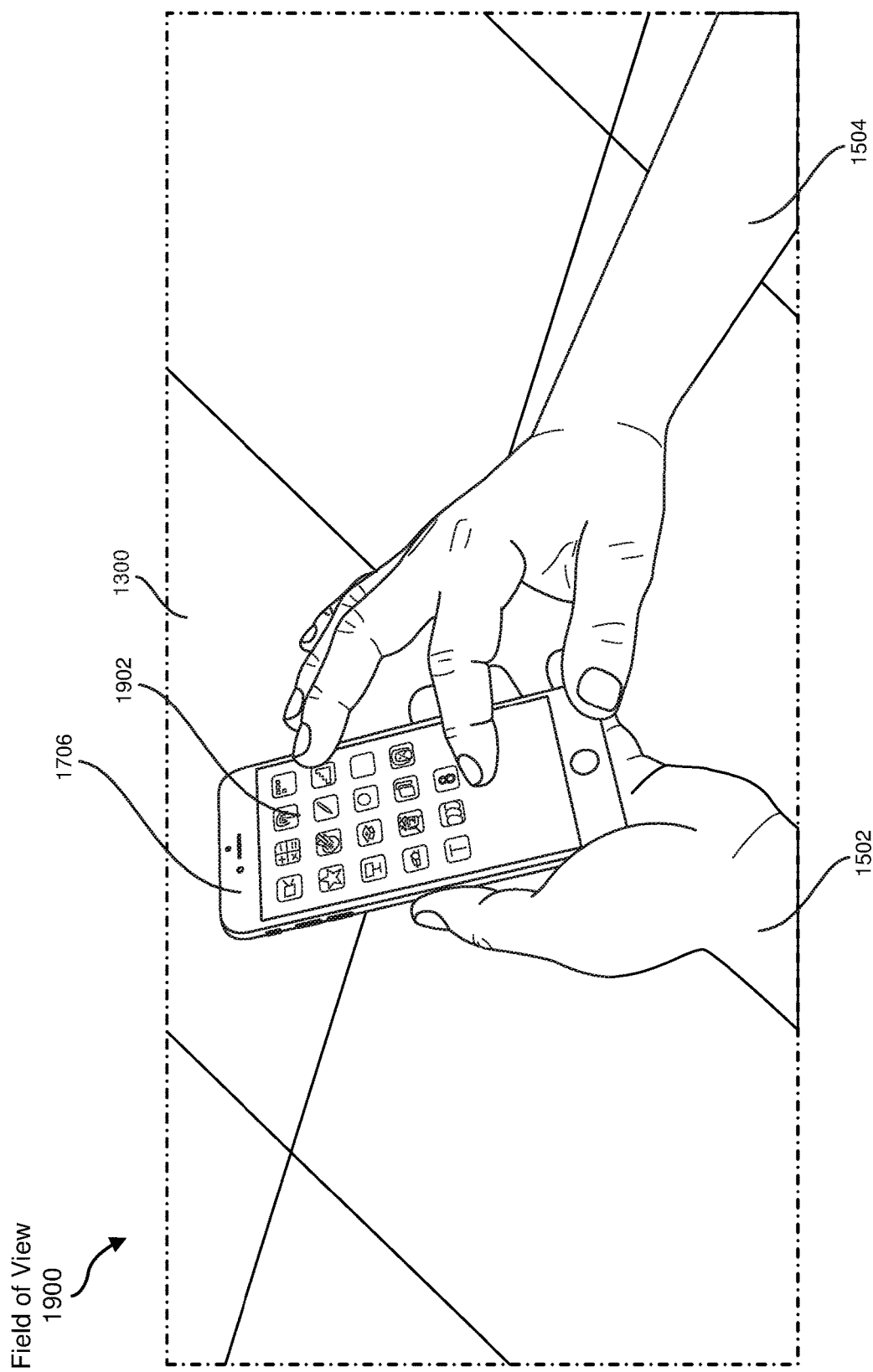
FIGS. 19 and 20 are illustrations of a user's field of view while the user wears a head-mounted display system, according to some embodiments of the present disclosure.
Figure 20:
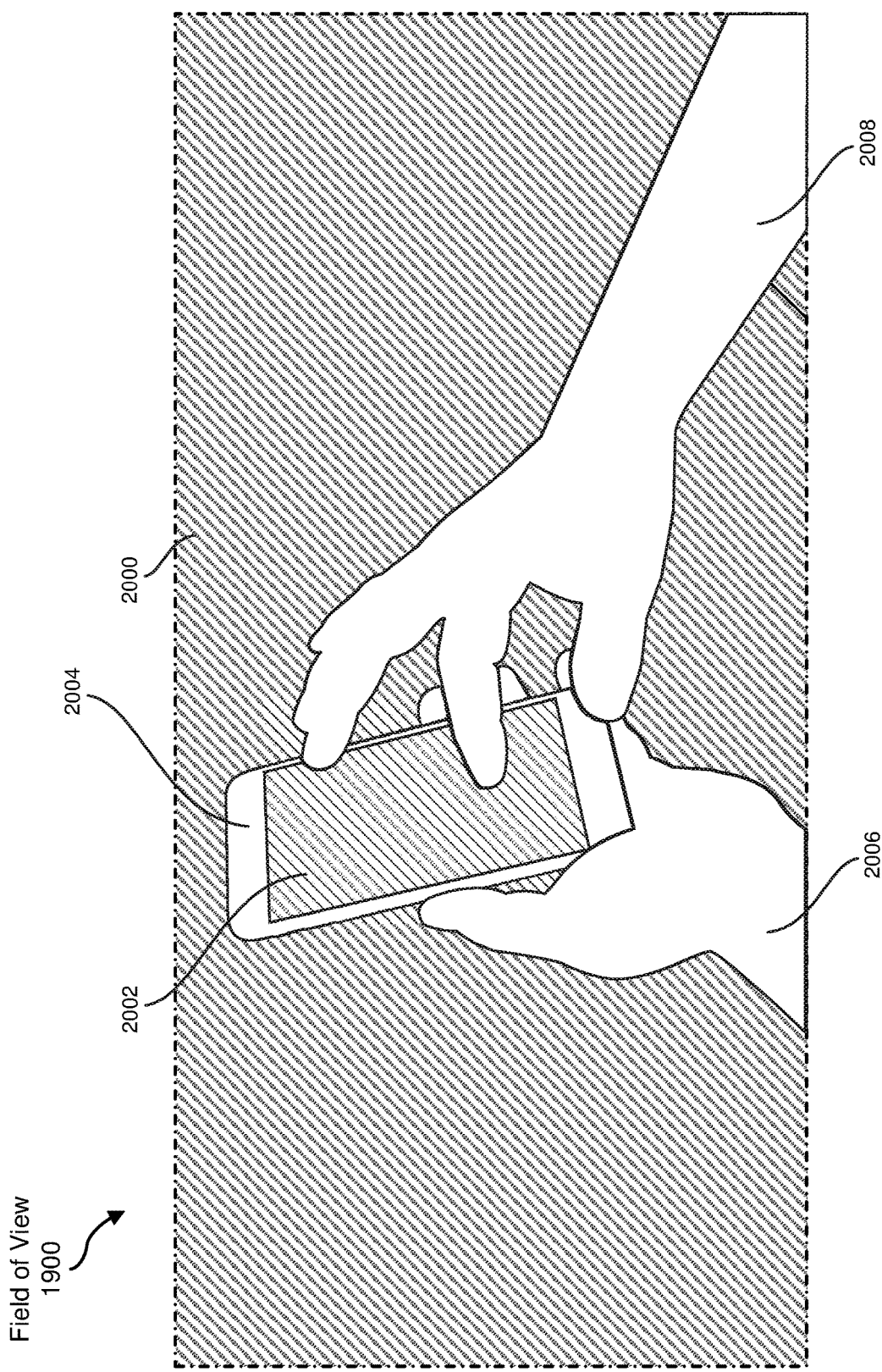
Figure 21:
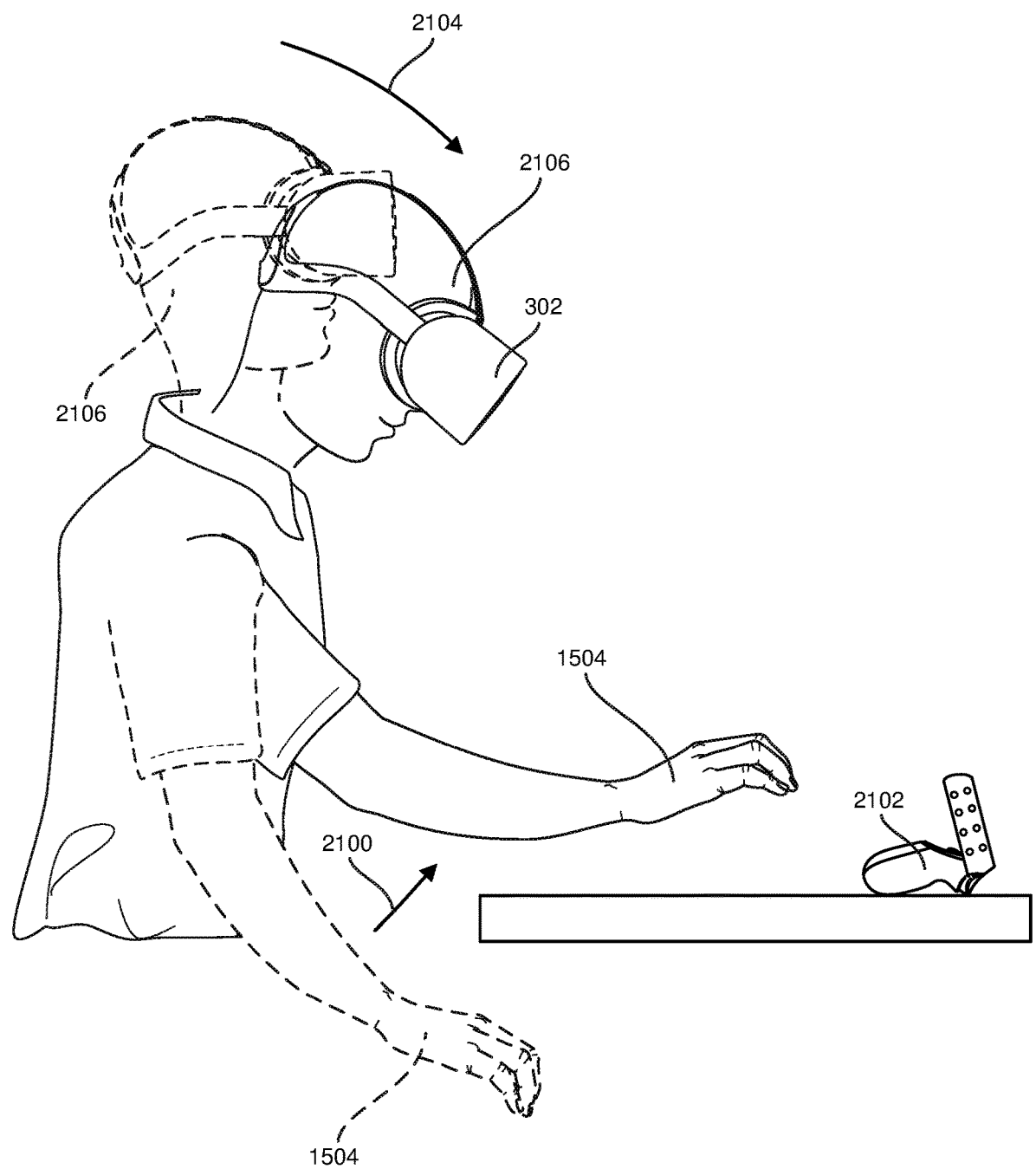
FIG. 21 presents an illustration of user gestures that may trigger a passing through of real-world objects, according to some embodiments of the present disclosure.
Figure 22:
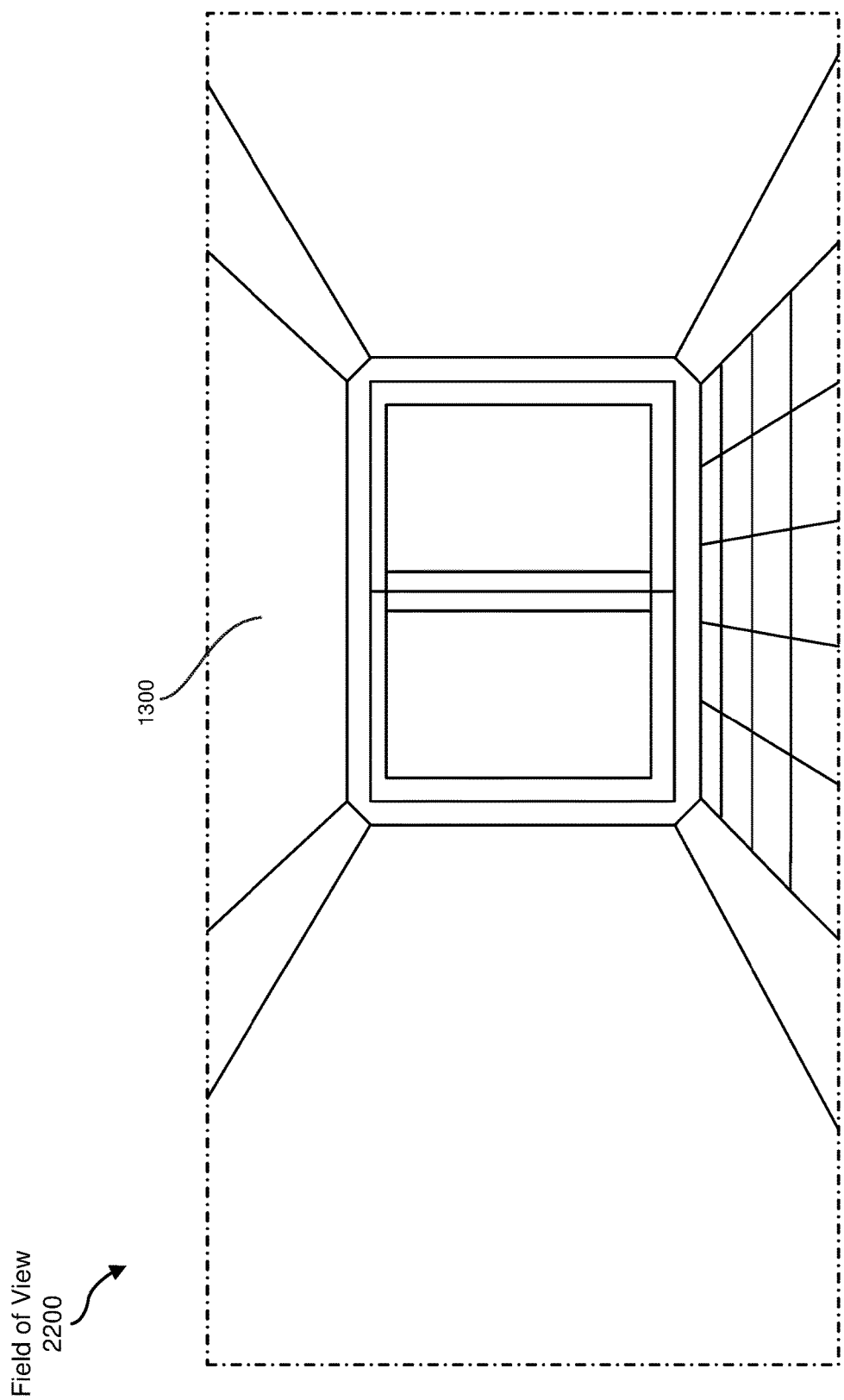
FIG. 22 presents an illustration of a user's field of view while the user is immersed in the virtual environment of FIG. 13, according to some embodiments of the present disclosure.
Figure 23:
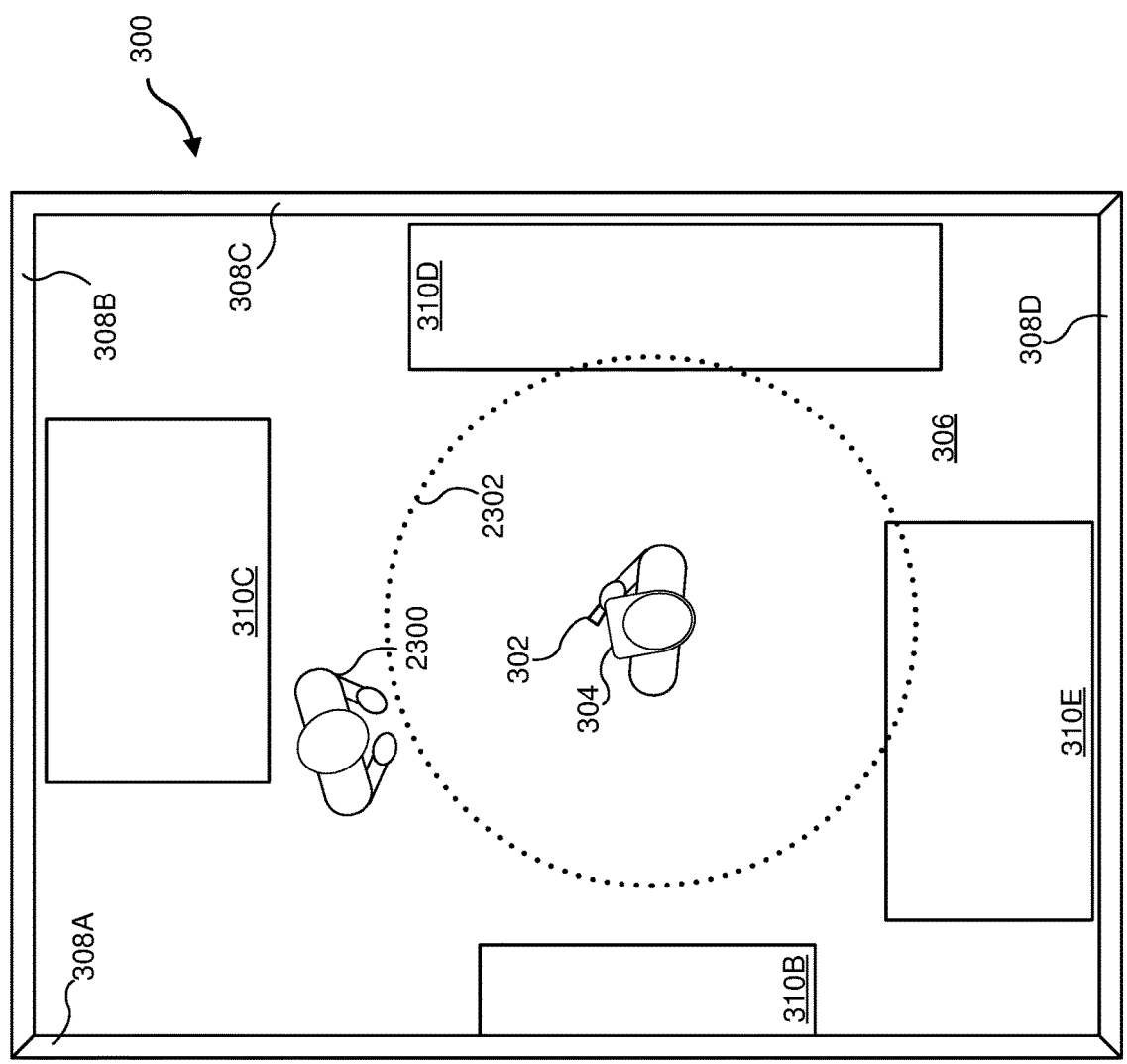
FIG. 23 presents another top view of the real-world environment of FIG. 3, according to some embodiments.
Figure 24:
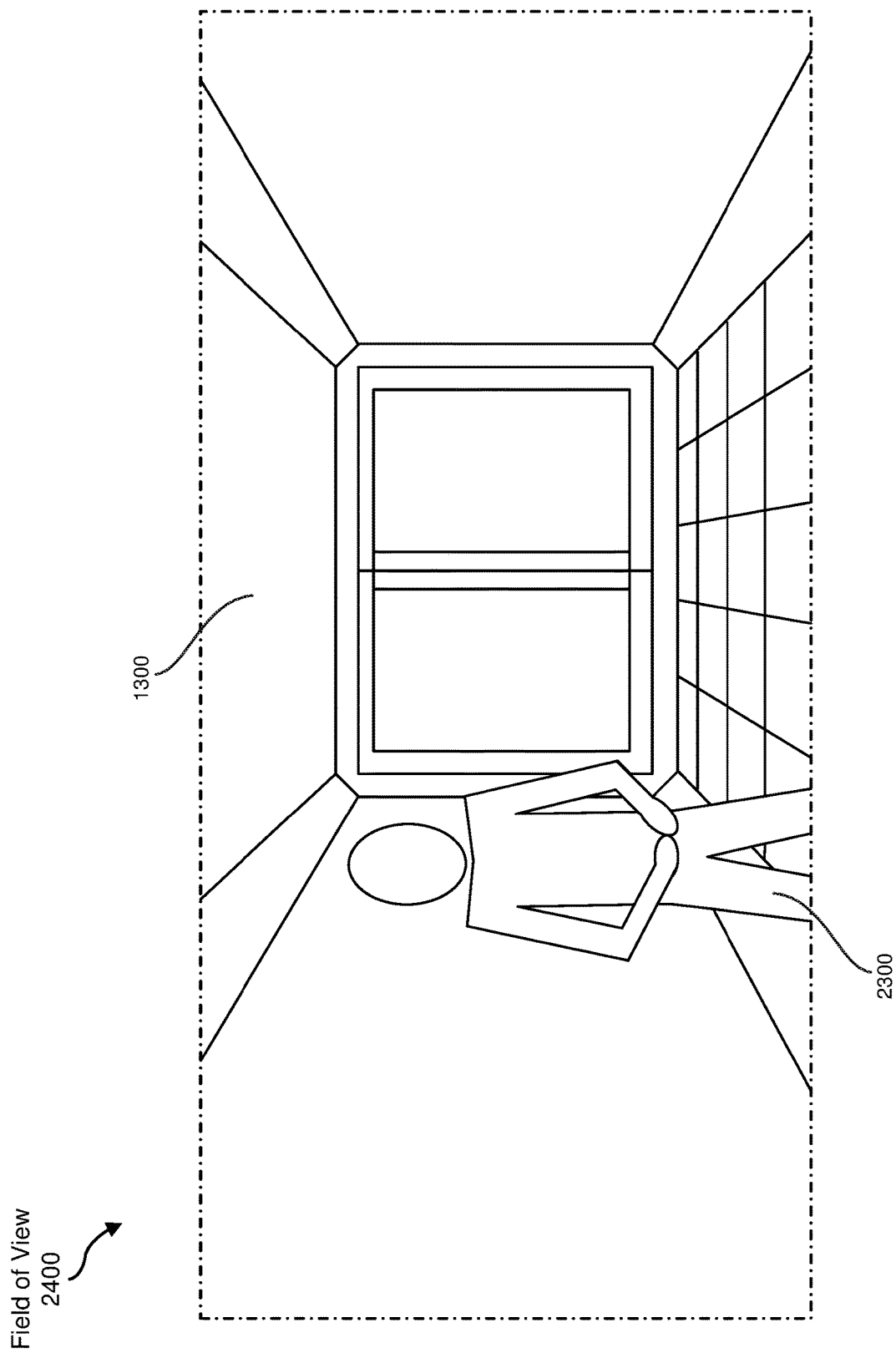

FIG. 15 illustrates an exemplary field of view 1500 in which the systems described herein have detected a pass-through triggering event that involves the presence of hands 1502 and 1504. FIG. 17 illustrates an exemplary field of view 1700 in which the systems described herein have detected a pass-through triggering event that involves the presence of a phone 1706. FIG. 19 illustrates an exemplary field of view 1900 in which the systems described herein have detected a pass-through triggering event involving the presence of hands 1502 and 1504 and the presence of phone 1706. In the example, shown in FIG. 19, a virtual display 1902 may have been projected onto phone 1706. FIG. 24 illustrates an exemplary field of view 2400 in which the systems described herein have detected a pass-through triggering event involving the presence of person 2300.

At step 1240, one or more of the systems described herein may identify one or more display regions corresponding to a region of the user's field of view occupied by the object. For example, the systems described herein may determine that display regions 1602 and 1604, shown in FIG. 16, correspond to the portions of field of view 1500 occupied by hands 1502 and 1504. Similarly, the systems described herein may determine that display region 1802, shown in FIG. 18, corresponds to the portions of field of view 1700 occupied by device 1706. In another example, the systems described herein may determine that display regions 2004, 2006, and 2008, shown in FIG. 20, correspond to the portions of field of view 1500 occupied by a portion of device 1706, hand 1502, and hand 1504. In yet another example, the systems described herein may determine that display region 2502, shown in FIG. 25, corresponds to the portions of field of view 2500 occupied by person 2300. In general, the systems described herein may determine which display regions correspond to a region of the user's field of view occupied by an object based on the relative positions of the user's eyes and the object relative to the display regions as well as the user's gaze direction. In some examples, the systems described herein may also take into consideration the relative positions of the display and the light-blocking device that make up a pass-through display.

At step 1250, one or more of the systems described herein may switch each of the one or more display regions to a pass-through state in which the view of the user's real-world environment in the corresponding region of the user's field of view is passed through to the user. For example, the systems described herein may switch display regions 1602 and 1604, shown in FIG. 16, to a pass-through state in order to pass hands 1502 and 1504 through virtual environment 1300, as shown in FIG. 15. Similarly, the systems described herein may switch display region 1802, shown in FIG. 18, to a pass-through state in order to pass device 1706 through virtual environment 1300, as shown in FIG. 17. In another example, the systems described herein may switch display regions 2004, 2006, and 2008, shown in FIG. 20, to a pass-through state in order to respectively pass a portion of device 1706, hand 1502, and hand 1504 through virtual environment 1300, as shown in FIG. 19. In yet another example, the systems described herein may switch display region 2502, shown in FIG. 25, to a pass-through state in order to respectively pass person 2300 through virtual environment 1300, as shown in FIG. 24.

Figure 26A:
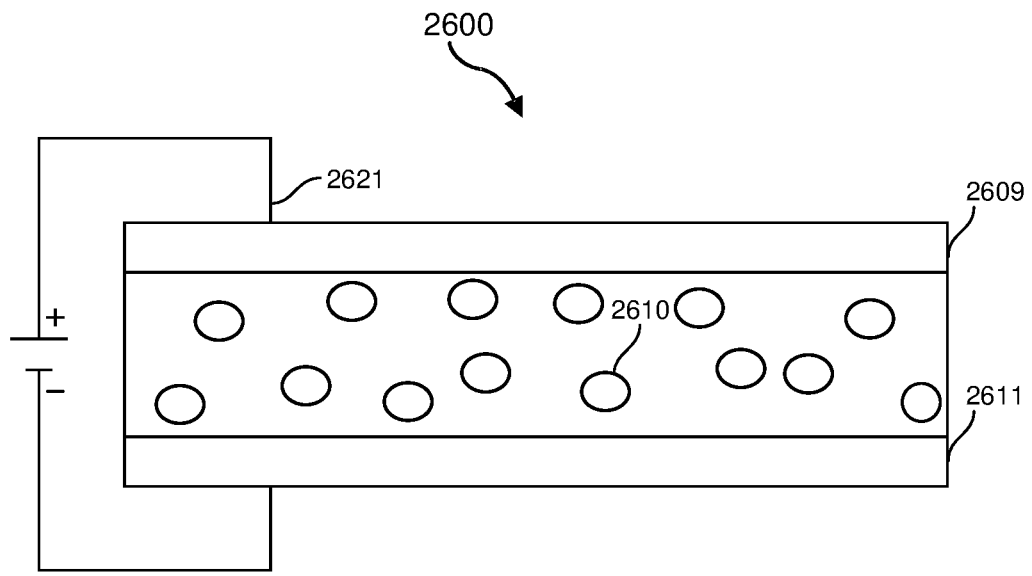
FIGS. 26A-27B are illustrations of exemplary switchable electroactive devices in uncompressed and compressed states, which may be used to selectively pass through optical views of real-world environments to a user's eye.
Figure 26B:
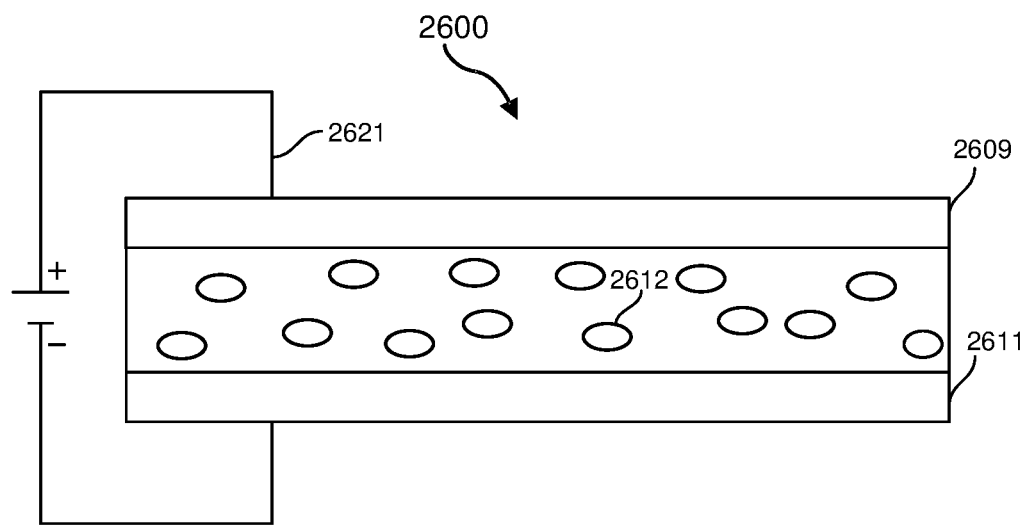

FIGS. 26A and 26B illustrate an exemplary switchable electroactive region 2600 of a light-blocking device (e.g., a screen) in an uncompressed state and in a compressed state, respectively. In particular, electroactive region 2600 may be configured to be opaque in an uncompressed state and transparent in a compressed state. As shown in FIG. 26A, electroactive region 2600 (e.g., an electroactive polymer (EAP)) may include nanovoids 2610. For example, as will be described in greater detail below, electroactive region 2600 may include a polymer material (e.g., an elastomeric polymer) defining a plurality of nanovoids 2610. Further, the electroactive region may include electrodes 2609 and 2611 electrically coupled to electroactive region 2600 and configured to apply an electric field to electroactive region 2600. Electrodes 2609 and 2611 may include any suitable electrically conductive material, such as, for example, an optically transparent material (e.g., a transparent conducting film including a transparent conductive oxide such as indium tin oxide, fluorine doped tin oxide, and/or doped zinc oxide, a conductive polymer such as a polyacetylene, polyaniline, polypyrrole, and/or polythiophene derivative, carbon nanotubes, and/or graphene). Moreover, a voltage may be applied to electroactive region 2600 using a circuit 2621 that generates an electric field across electroactive region 2600. In some examples, electroactive region 2600 may be compressible by an application of the electric field which decreases the nanovoids' average size and increases a density of nanovoids in electroactive region 2600.

FIG. 26A shows electroactive region 2600 in an uncompressed state in which circuit 2621 of the electroactive region applies no voltage or a relatively low voltage across electroactive region 2600 via electrodes 2609 and 2611. Accordingly, nanovoids 2610 may be larger in size with respect to a compressed state and may therefore scatter incident light. As noted, the uncompressed state of electroactive region 2600 (FIG. 26A) may correspond to the nanovoids having a size on the order of a wavelength of the light, and the compressed state of electroactive region 2600 (FIG. 26B) may correspond to the nanovoids having a size that is substantially smaller than the wavelength of the light. For example, electroactive region 2600 may scatter light having wavelengths in the visible spectrum (i.e., about 380 to about 2740 nm) or at least a portion thereof. Moreover, the degree of scattering of incident light by electroactive region 2600 may be based, at least in part, on the density or the average size of the nanovoids. In some examples, the size of the nanovoids may range from about 0.1 nm to about 26000 nm. Further, the size range for the nanovoids (e.g., the polydispersity of the nanovoids) may vary by a factor of about five or more (i.e., the nanovoids may exhibit a diameter change of 5X or more) between the compressed and uncompressed states (e.g., the size range for the nanovoids between the compressed and uncompressed states may vary by a factor of between approximately 2 to approximately 20 or more). In some examples, the shape of the nanovoids in electroactive region 2600 may include any suitable shape including, but not limited to, spheroid shapes, ellipsoid shapes, disk-like shapes, and/or irregular shapes, and the nanovoid shapes may change between the compressed and uncompressed states.

In some examples, electroactive region 2600 may include a single pair of electrodes, such as electrodes 2609 and 2611, or multiple pairs of electrodes (not shown) which may be patterned across a region of an electroactive element (e.g., similar to electroactive region 2600). In particular, electroactive region 2600 may correspond to an aperture associated with the electroactive region as used in an HMD. This may be done in order to create spatially controllable light scattering (e.g., scattering that is implemented with differing magnitudes at different regions of electroactive region 2600). Further, while electrodes may serve to impart an electric field onto electroactive region 2600 and modify the electroactive region properties as described herein, in other examples, electroactive region 2600 may be switched with at least a partially non-electrical technique. In particular, electroactive region 2600 may be switched based on a mechanical compression of electroactive region 2600 or may be switched using acoustic waves that may propagate through electroactive region 2600.

FIG. 26B shows electroactive region 2600 in a compressed state. In particular, circuit 2621 may apply an increased voltage across electroactive region 2600 via electrodes 2609 and 2611. Accordingly, the disclosed systems may apply an electric field (not shown) between the electrodes 2609 and 2611 of the electroactive region. This may lead to the compression of nanovoids 2612 as compared with their uncompressed state (shown and described in connection with FIG. 26A, above). The magnitude of the electric field may be configured to modify the extent of the compression of nanovoids 2612. For example, the magnitude may be configured to reduce the size of nanovoids 2612 to be relatively smaller than the wavelength of incident light on electroactive region 2600 (e.g., smaller than wavelengths of light in the visible spectrum or at least a portion thereof), causing electroactive region 2600 to become relatively transparent, thus allowing the incident light to propagate through electroactive region 2600.

As nanovoids 2612 are compressed, the size of nanovoids 2612 may become several orders of magnitude smaller than wavelengths of light incident on electroactive region 2600. In this case, the amount of light scattered from electroactive region 2600 due to nanovoids 2612 may be minimized during compression. Further, the interaction of electromagnetic fields with nanovoids 2612 having a size that is substantially smaller than wavelengths of incident light may lead to Rayleigh scattering of the incident light from nanovoids 2612. As the size of nanovoids 2612 in electroactive region 2600 increases, the amount of scattered light from electroactive region 2600 may also increase. If nanovoids 2612 are in the same or substantially the same size range as wavelengths of incident light, a Mie scattering mechanism may describe the scattering of the light from nanovoids 2612.

In some examples, when there is little or no electric field applied to electroactive region 2600 by electrodes 2609 and 2611, the size of nanovoids 2612 may be less than about 26000 nm and greater than about 400 nm. As noted, the application of electric field across electroactive region 2600 may result in a mechanical compression of electroactive region 2600 from a prior uncompressed state. The magnitude of electric fields across the electrodes 2609 and 2611 can selected to change the size and density of the nanovoids 2612 to achieve a desired amount of in transparency between the compressed and uncompressed states. In a compressed state, nanovoids 2612 of electroactive region 2600 may be reduced, in the compressed state, to sizes of from about 0.1 nm to about 50 nm based on the magnitude of the applied electrical field.

Figure 27A:
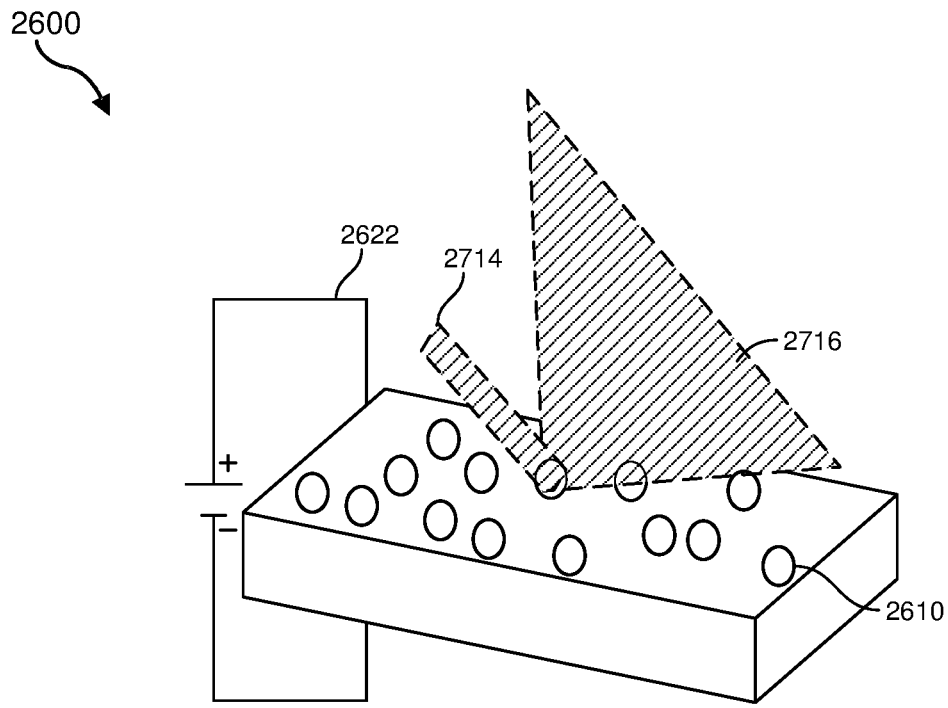
Figure 27B:
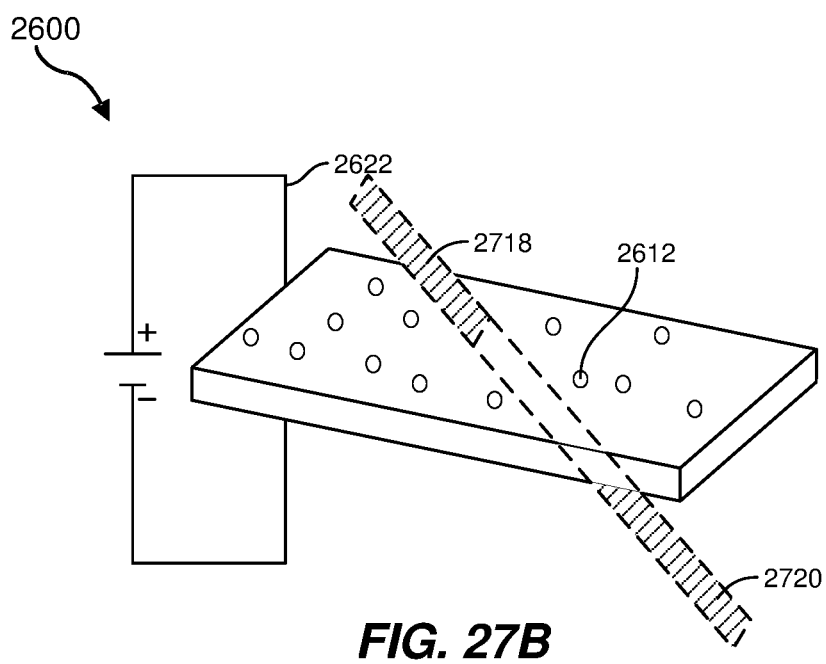

FIGS. 27A and 27B illustrate exemplary switchable electroactive region 2600 of a light-blocking device in an uncompressed state and a compressed state, respectively. In particular, FIG. 27A shows incident light 2714 scattering off electroactive region 2600 in the uncompressed state to produce scattered light 2716 via a Rayleigh scattering mechanism. As noted, this scattering may be due to the fact that nanovoids 2610 may have a size that is on the order of the wavelength of incident light when a voltage applied by circuit 2622 (e.g., via opposed electrodes, such as electrodes 2609 and 2611 in FIGS. 26A and 26B) is below a predetermined threshold. Further, the fraction of incident light 2714 may be scattered because the size of nanovoids 2610 is within about 0.1 to about 270 times the wavelength of incident light 2714. In one example, the fraction of scattered light 2716 can be anywhere from greater than about 95% to less than about 5% of incident light 2714 on electroactive region 2600.

FIG. 27B shows a compressed state of electroactive region 2600 shown in FIG. 26A. In particular, incident light 2718 may be transmitted through electroactive region 2600 to produce transmitted light 2720 when nanovoids 2612 are compressed to be much smaller than the wavelength of incident light 2718. As noted, nanovoids 2612 may be compressed when an electric field is applied to electroactive region 2600 as a result of a voltage applied by circuit 2622.

In particular, if a beam of visible wavelength light (e.g., incident light 2718) is directed towards electroactive region 2600 when electroactive region 2600 is in a compressed state, electroactive region 2600 may scatter relatively little light because the size of nanovoids 2612 may be much smaller than the wavelength of light. Accordingly, electroactive region 2600 may be transparent in the visible portion of the electromagnetic spectrum. In another embodiment, by modulating the electrical field applied across electroactive region 2600 as a function of time, electroactive region 2600 can serve as a switchable component, such as, for example, a switchable screen, a time-varying beam-block, and/or a time-varying intensity modulator for light in the visible and near-infrared portion of the electromagnetic spectrum.

Figure 28A:
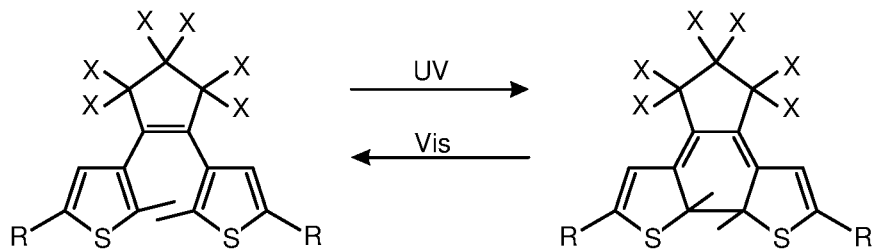
FIGS. 28A-28C show representative photochromic materials that may be used in blocking elements in accordance with some embodiments.
Figure 28B:
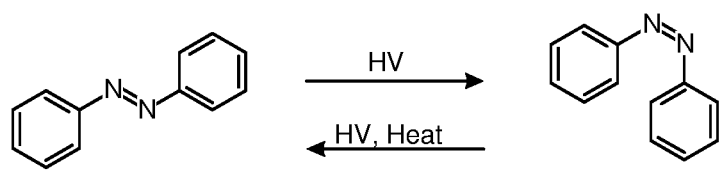
Figure 28C:
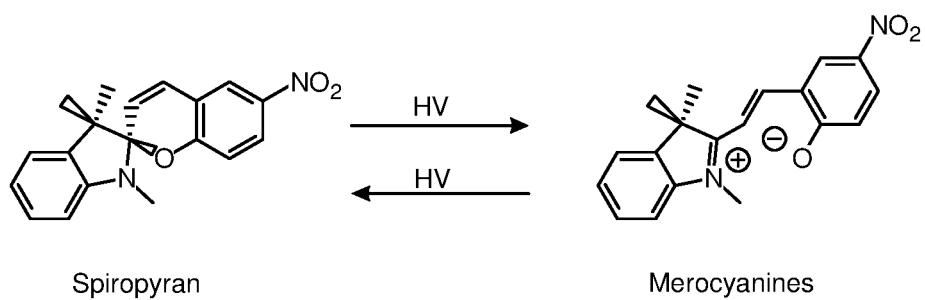

FIGS. 28A-28C show representative photochromic materials that may be used in blocking elements in accordance with some embodiments. FIG. 28A shows diarylethene photochromic materials that may be switched to a second state using UV and may revert back to the first state under visible illumination. FIG. 28B shows azobenzene photochromic materials that may be switched to a second state using UV and revert back to the first state under a combination of light and/or heat. FIG. 28C shows spiropyran materials (e.g., thiospiropyrans or nitrospiropyrans). Other example photochromic materials may include oxazine (e.g., which switches to a dark second state using light and reverts back to a clear first state under heat), napthopyrans (e.g., which switches to a dark second state using light and reverts back to a clear first state under heat), derivatives and other combinations of materials mentioned herein, and the like. In some examples, blue or violet light may be used to induce the second photochromic state (e.g., the dark state), instead of, or additional to, the use of UV. In some examples, a photochromic material may be present as a layer. In some examples, a liquid crystal layer may include a photochromic material. If the photochromic material is anisotropic, it may be aligned by the liquid crystal. In some examples, a liquid crystal material may include molecules (such as nematogens) having a photochromic moiety.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure. By way of example and not limitation, some embodiments of the present disclosure include the following:

Example 1: A computer-implemented method that includes (1) displaying one or more images to a user via a pass-through display having multiple display regions, (2) switching each of the display regions to a blocking state in which a view of the user's real-world environment in a corresponding region of the user's field of view is blocked from the user, (3) detecting a pass-through triggering event involving an object in the user's real-world environment, (4) identifying one or more display regions corresponding to a region of the user's field of view occupied by the object, and (5) switching each of the one or more display regions to a pass-through state in which the view of the user's real-world environment in the corresponding region of the user's field of view is passed through to the user.

Example 2: The computer-implemented method of Example 1, wherein (1) the pass-through display is a head-mounted display, (2) the one or more images convey an evolving artificial-reality environment, and (3) the pass-through triggering event is detected while all the display regions of the pass-through display are in the blocking state and the user is immersed in the evolving artificial-reality environment.

Example 3: The computer-implemented method of Example 2, wherein (1) the object is a type of object with which the user can interact with the evolving artificial-reality environment and (2) detecting the pass-through triggering event includes detecting when the object is in the user's field of view.

Example 4: The computer-implemented method of Example 1, wherein (1) the object is a hazard in the user's real-world environment and (2) detecting the pass-through triggering event includes detecting when the hazard endangers the user above a predetermined threshold.

Example 5: The computer-implemented method of Example 1, wherein (1) the object is a type of object with which the user is likely to interact and (2) the pass-through triggering event is known to precede an interaction by the user with the object.

Example 6: The computer-implemented method of Example 1, wherein (1) the object is a type of object with which the user is likely to interact and (2) detecting the pass-through triggering event includes detecting an action by the object that is likely to precede an interaction by the user with the object.

Example 7: The computer-implemented method of Example 1, wherein (1) the object is a type of object with which the user is likely to interact and (2) detecting the pass-through triggering event includes detecting an action by the user that indicates an intention to interact with the object.

Example 8: The computer-implemented method of Example 7, wherein detecting the action that indicates an intention to interact with the object includes detecting when the user turns towards the object.

Example 9: The computer-implemented method of Example 7, wherein detecting the action that indicates an intention to interact with the object includes detecting when the user reaches towards the object.

Example 10: The computer-implemented method of Example 1, wherein (1) the object is a person and (2) detecting the pass-through triggering event includes detecting an action by the person that is likely to precede an interaction by the user with the person.

Example 11: The computer-implemented method of Example 1, wherein (1) the object is a person and (2) detecting the pass-through triggering event includes detecting an action by the user that indicates an intention to interact with the person.

Example 12: The computer-implemented method of Example 1, wherein (1) the object includes a portion of the user's body and (2) detecting the pass-through triggering event includes detecting when the portion of the user's body is in the user's field of view.

Example 13: The computer-implemented method of Example 1, wherein (1) the object is a portion of the user's body and (2) detecting the pass-through triggering event includes detecting an action by the user that indicates an intention to use the portion of the user's body to interact with the user's real-world environment.

Example 14: The computer-implemented method of Example 1, further comprising (1) detecting a movement of the object relative to the field of view of the user, (2) identifying, after the movement, one or more additional display regions corresponding to an additional region of the user's field of view occupied by the object, and (3) switching each of the one or more additional display regions to the pass-through state.

Example 15: The computer-implemented method of Example 1, further comprising (1) detecting a movement of the object relative to the field of view of the user, (2) identifying, after the movement, at least one of the one or more display regions no longer corresponding to an additional region of the user's field of view occupied by the object, and (3) switching the at least one of the one or more display regions to the blocking state.

Example 16: A head-mounted display system including (1) a light-emitting transparent display having multiple light-emitting regions, (2) a light-blocking device having multiple light-blocking regions corresponding to the light-emitting regions, (3) a display-driving subsystem that displays one or more images to a user via the light-emitting transparent display, and (4) a pass-through subsystem that (a) switches each of the light-blocking regions to a blocking state in which light from the user's real-world environment in a corresponding region of the user's field of view is blocked from the user, (b) detects a pass-through triggering event involving an object in the user's real-world environment, (c) identifies one or more light-blocking regions corresponding to a region of the user's field of view occupied by the object, and (d) switches each of the one or more light-blocking regions to a pass-through state in which light from the user's real-world environment in the corresponding region of the user's field of view is passed through to the user.

Example 17: The system of Example 16, wherein the light-emitting transparent display is a waveguide display.

Example 18: The system of Example 16, wherein each of the light-blocking regions includes an electrochromic material that is selectively transmissive.

Example 19: The system of Example 16, wherein each of the light-blocking regions includes an electronic shutter.

Example 20: A head-mounted display system including (1) a display having multiple display regions, (2) an opaque element that blocks light from a user's real-world environment from passing through the display and reaching the user, (3) one or more camera sensors operable to capture a digital view of the user's real-world environment corresponding to the user's field of view occupied by the display, and (4) a pass-through subsystem that (a) displays one or more images to the user via the display and, while displaying the one or more images, (b) detects a pass-through triggering event, (c) identifies an object in the digital view of the user's real-world environment associated with the pass-through triggering event, and (d) selectively displays, via the display, a portion of the digital view of the user's real-world environment corresponding to the object to the user.

Embodiments of the present disclosure may include or be implemented in conjunction with various types of artificial-reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 2900 in FIG. 29. Other artificial-reality systems may include an NED that also provides visibility into the real world (e.g., augmented-reality system 3000 in FIG. 30) or that visually immerses a user in an artificial reality (e.g., virtual-reality system 3100 in FIG. 31). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 29:
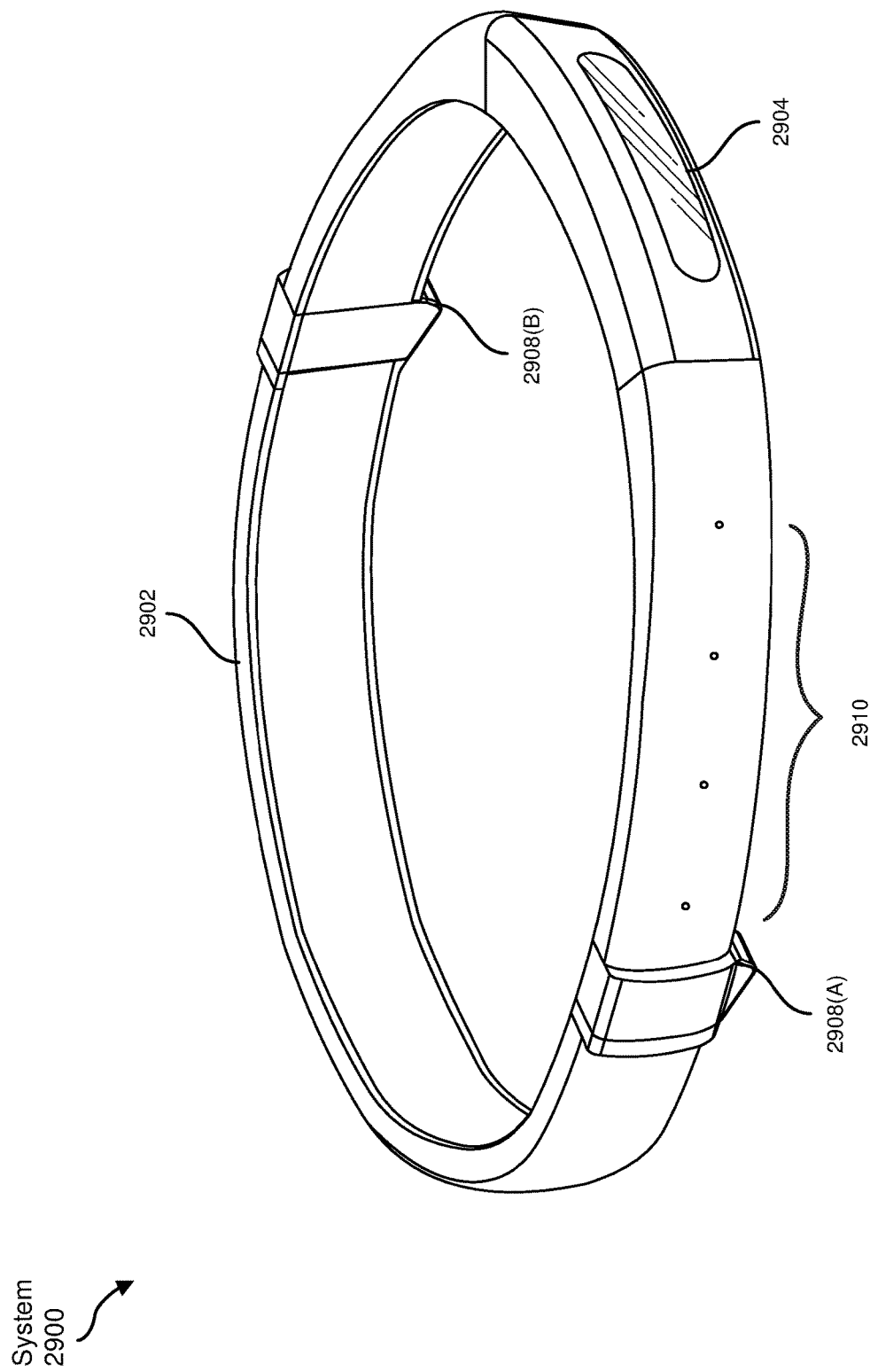
FIG. 29 is an illustration of an exemplary artificial-reality headband that may be used in connection with embodiments of this disclosure.

Turning to FIG. 29, augmented-reality system 2900 generally represents a wearable device dimensioned to fit about a body part (e.g., a head) of a user. As shown in FIG. 29, system 2900 may include a frame 2902 and a camera assembly 2904 that is coupled to frame 2902 and configured to gather information about a local environment by observing the local environment. Augmented-reality system 2900 may also include one or more audio devices, such as output audio transducers 2908(A) and 2908(B) and input audio transducers 2910. Output audio transducers 2908(A) and 2908(B) may provide audio feedback and/or content to a user, and input audio transducers 2910 may capture audio in a user's environment.

As shown, augmented-reality system 2900 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 2900 may not include an NED, augmented-reality system 2900 may include other types of screens or visual feedback devices (e.g., a display screen integrated into a side of frame 2902).

Figure 30:
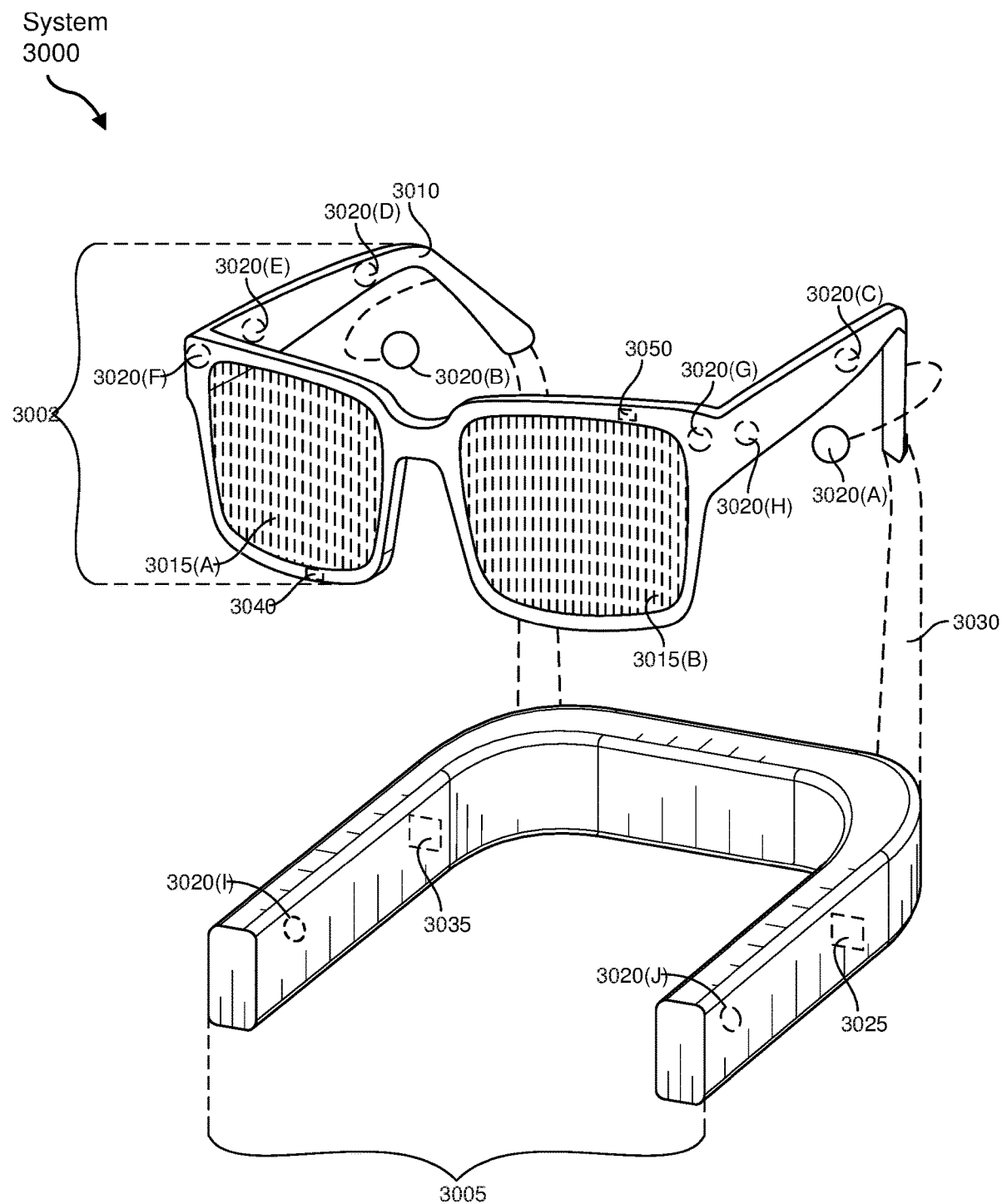
FIG. 30 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 30, augmented-reality system 3000 may include an eyewear device 3002 with a frame 3010 configured to hold a left display device 3015(A) and a right display device 3015(B) in front of a user's eyes. Display devices 3015(A) and 3015(B) may act together or independently to present an image or series of images to a user. While augmented-reality system 3000 includes two displays, embodiments of this disclosure may be implemented in augmented-reality systems with a single NED or more than two NEDs.

In some embodiments, augmented-reality system 3000 may include one or more sensors, such as sensor 3040. Sensor 3040 may generate measurement signals in response to motion of augmented-reality system 3000 and may be located on substantially any portion of frame 3010. Sensor 3040 may represent a position sensor, an inertial measurement unit (IMU), a depth camera assembly, or any combination thereof. In some embodiments, augmented-reality system 3000 may or may not include sensor 3040 or may include more than one sensor. In embodiments in which sensor 3040 includes an IMU, the IMU may generate calibration data based on measurement signals from sensor 3040. Examples of sensor 3040 may include, without limitation, accelerometers, gyroscopes, magnetometers, other suitable types of sensors that detect motion, sensors used for error correction of the IMU, or some combination thereof. Augmented-reality system 3000 may also include a microphone array with a plurality of acoustic transducers 3020(A)-3020(J), referred to collectively as acoustic transducers 3020. Acoustic transducers 3020 may be transducers that detect air pressure variations induced by sound waves. Each acoustic transducer 3020 may be configured to detect sound and convert the detected sound into an electronic format (e.g., an analog or digital format). The microphone array in FIG. 2 may include, for example, ten acoustic transducers: 3020(A) and 3020(B), which may be designed to be placed inside a corresponding ear of the user, acoustic transducers 3020(C), 3020(D), 3020(E), 3020(F), 3020(G), and 3020(H), which may be positioned at various locations on frame 3010, and/or acoustic transducers 3020(I) and 3020(J), which may be positioned on a corresponding neckband 3005.

In some embodiments, one or more of acoustic transducers 3020(A)-(F) may be used as output transducers (e.g., speakers). For example, acoustic transducers 3020(A) and/or 3020(B) may be earbuds or any other suitable type of headphone or speaker.

The configuration of acoustic transducers 3020 of the microphone array may vary. While augmented-reality system 3000 is shown in FIG. 30 as having ten acoustic transducers 3020, the number of acoustic transducers 3020 may be greater or less than ten. In some embodiments, using higher numbers of acoustic transducers 3020 may increase the amount of audio information collected and/or the sensitivity and accuracy of the audio information. In contrast, using a lower number of acoustic transducers 3020 may decrease the computing power required by an associated controller 3050 to process the collected audio information. In addition, the position of each acoustic transducer 3020 of the microphone array may vary. For example, the position of an acoustic transducer 3020 may include a defined position on the user, a defined coordinate on frame 3010, an orientation associated with each acoustic transducer 3020, or some combination thereof.

Acoustic transducers 3020(A) and 3020(B) may be positioned on different parts of the user's ear, such as behind the pinna or within the auricle or fossa. Or, there may be additional acoustic transducers 3020 on or surrounding the ear in addition to acoustic transducers 3020 inside the ear canal. Having an acoustic transducer 3020 positioned next to an ear canal of a user may enable the microphone array to collect information on how sounds arrive at the ear canal. By positioning at least two of acoustic transducers 3020 on either side of a user's head (e.g., as binaural microphones), augmented-reality device 3000 may simulate binaural hearing and capture a 3D stereo sound field around about a user's head. In some embodiments, acoustic transducers 3020(A) and 3020(B) may be connected to augmented-reality system 3000 via a wired connection 3030, and in other embodiments, acoustic transducers 3020(A) and 3020(B) may be connected to augmented-reality system 3000 via a wireless connection (e.g., a Bluetooth connection). In still other embodiments, acoustic transducers 3020(A) and 3020(B) may not be used at all in conjunction with augmented-reality system 3000.

Acoustic transducers 3020 on frame 3010 may be positioned along the length of the temples, across the bridge, above or below display devices 3015(A) and 3015(B), or some combination thereof. Acoustic transducers 3020 may be oriented such that the microphone array is able to detect sounds in a wide range of directions surrounding the user wearing the augmented-reality system 3000. In some embodiments, an optimization process may be performed during manufacturing of augmented-reality system 3000 to determine relative positioning of each acoustic transducer 3020 in the microphone array.

In some examples, augmented-reality system 3000 may include or be connected to an external device (e.g., a paired device), such as neckband 3005. Neckband 3005 generally represents any type or form of paired device. Thus, the following discussion of neckband 3005 may also apply to various other paired devices, such as charging cases, smart watches, smart phones, wrist bands, other wearable devices, hand-held controllers, tablet computers, laptop computers and other external compute devices, etc.

As shown, neckband 3005 may be coupled to eyewear device 3002 via one or more connectors. The connectors may be wired or wireless and may include electrical and/or non-electrical (e.g., structural) components. In some cases, eyewear device 3002 and neckband 3005 may operate independently without any wired or wireless connection between them. While FIG. 30 illustrates the components of eyewear device 3002 and neckband 3005 in example locations on eyewear device 3002 and neckband 3005, the components may be located elsewhere and/or distributed differently on eyewear device 3002 and/or neckband 3005. In some embodiments, the components of eyewear device 3002 and neckband 3005 may be located on one or more additional peripheral devices paired with eyewear device 3002, neckband 3005, or some combination thereof.

Pairing external devices, such as neckband 3005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 3000 may be provided by a paired device or shared between a paired device and an eyewear device, thus reducing the weight, heat profile, and form factor of the eyewear device overall while still retaining desired functionality. For example, neckband 3005 may allow components that would otherwise be included on an eyewear device to be included in neckband 3005 since users may tolerate a heavier weight load on their shoulders than they would tolerate on their heads. Neckband 3005 may also have a larger surface area over which to diffuse and disperse heat to the ambient environment. Thus, neckband 3005 may allow for greater battery and computation capacity than might otherwise have been possible on a stand-alone eyewear device. Since weight carried in neckband 3005 may be less invasive to a user than weight carried in eyewear device 3002, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 3005 may be communicatively coupled with eyewear device 3002 and/or to other devices. These other devices may provide certain functions (e.g., tracking, localizing, depth mapping, processing, storage, etc.) to augmented-reality system 3000. In the embodiment of FIG. 30, neckband 3005 may include two acoustic transducers (e.g., 3020(1) and 3020(J)) that are part of the microphone array (or potentially form their own microphone subarray). Neckband 3005 may also include a controller 3025 and a power source 3035.

Acoustic transducers 3020(1) and 3020(J) of neckband 3005 may be configured to detect sound and convert the detected sound into an electronic format (analog or digital). In the embodiment of FIG. 30, acoustic transducers 3020(1) and 3020(J) may be positioned on neckband 3005, thereby increasing the distance between the neckband acoustic transducers 3020(1) and 3020(J) and other acoustic transducers 3020 positioned on eyewear device 3002. In some cases, increasing the distance between acoustic transducers 3020 of the microphone array may improve the accuracy of beamforming performed via the microphone array. For example, if a sound is detected by acoustic transducers 3020(C) and 3020(D) and the distance between acoustic transducers 3020(C) and 3020(D) is greater than, e.g., the distance between acoustic transducers 3020(D) and 3020(E), the determined source location of the detected sound may be more accurate than if the sound had been detected by acoustic transducers 3020(D) and 3020(E).

Controller 3025 of neckband 3005 may process information generated by the sensors on neckband 3005 and/or augmented-reality system 3000. For example, controller 3025 may process information from the microphone array that describes sounds detected by the microphone array. For each detected sound, controller 3025 may perform a direction-of-arrival (DOA) estimation to estimate a direction from which the detected sound arrived at the microphone array. As the microphone array detects sounds, controller 3025 may populate an audio data set with the information. In embodiments in which augmented-reality system 3000 includes an inertial measurement unit, controller 3025 may compute all inertial and spatial calculations from the IMU located on eyewear device 3002. A connector may convey information between augmented-reality system 3000 and neckband 3005 and between augmented-reality system 3000 and controller 3025. The information may be in the form of optical data, electrical data, wireless data, or any other transmittable data form. Moving the processing of information generated by augmented-reality system 3000 to neckband 3005 may reduce weight and heat in eyewear device 3002, making it more comfortable to the user.

Power source 3035 in neckband 3005 may provide power to eyewear device 3002 and/or to neckband 3005. Power source 3035 may include, without limitation, lithium ion batteries, lithium-polymer batteries, primary lithium batteries, alkaline batteries, or any other form of power storage. In some cases, power source 3035 may be a wired power source. Including power source 3035 on neckband 3005 instead of on eyewear device 3002 may help better distribute the weight and heat generated by power source 3035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 3100 in FIG. 31, that mostly or completely covers a user's field of view. Virtual-reality system 3100 may include a front rigid body 3102 and a band 3104 shaped to fit around a user's head. Virtual-reality system 3100 may also include output audio transducers 3106(A) and 3106(B). Furthermore, while not shown in FIG. 31, front rigid body 3102 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 3000 and/or virtual-reality system 3100 may include one or more liquid crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in augmented-reality system 3000 and/or virtual-reality system 3100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, augmented-reality system 2900, augmented-reality system 3000, and/or virtual-reality system 3100 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 29 and 31, output audio transducers 2908(A), 2908(B), 3106(A), and 3106(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 2910 may include condenser microphones, dynamic microphones, ribbon microphones, and/or any other type or form of input transducer. In some embodiments, a single transducer may be used for both audio input and audio output.

Figure 31:
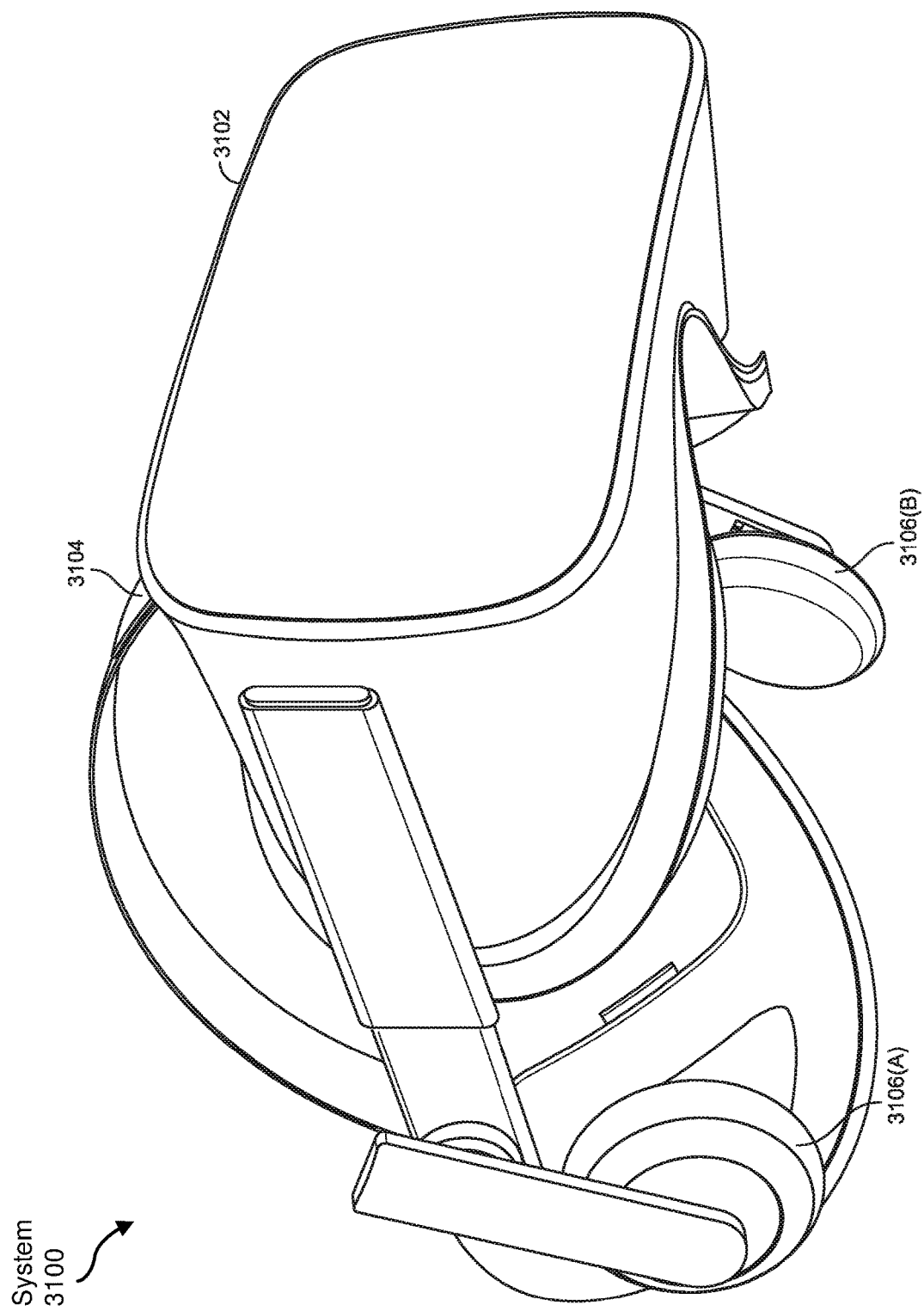
FIG. 31 is an illustration of an exemplary virtual-reality headset that may be used in connection with embodiments of this disclosure.

While not shown in FIGS. 29-31, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 2900, 3000, and 3100 of FIGS. 29-31, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's augmented reality/virtual reality device on demand.

As detailed above, the computing devices and systems described and/or illustrated herein broadly represent any type or form of computing device or system capable of executing computer-readable instructions, such as those contained within the subsystems and/or modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the subsystems and/or modules described and/or illustrated herein may represent portions of a single module or application. In addition, in certain embodiments one or more of these subsystems and/or modules may represent one or more software applications or programs that, when executed by a computing device, may cause the computing device to perform one or more tasks. For example, one or more of the subsystems and/or modules described and/or illustrated herein may represent subsystems and/or modules stored and configured to run on one or more of the computing devices or systems described and/or illustrated herein. One or more of these subsystems and/or modules may also represent all or portions of one or more special-purpose computers configured to perform one or more tasks.

In addition, one or more of the subsystems and/or modules described herein may transform data, physical devices, and/or representations of physical devices from one form to another. For example, one or more of the subsystems and/or modules recited herein may receive or detect a pass-through event involving a real-world object in a user's real-world environment, transform the pass-through event into light-blocking instructions, output a result of the transformation to a light-blocking device that includes a plurality of blocking regions that selectively blocks or transmits light according to the light-blocking instructions, and use the result of the transformation to selectively pass a view of the real-world object through a display device to the user. Additionally or alternatively, one or more of the subsystems and/or modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    displaying one or more images to a user via a pass-through display comprising multiple display regions;
    switching each of the display regions to a blocking state in which a view of the user's real-world environment in a corresponding region of the user's field of view is blocked from the user;
    detecting a pass-through triggering event involving a real object in the user's real-world environment;

identifying, in response to the pass-through triggering event, display regions of the pass-through display that block, when in the blocking state, a region of the user's field of view occupied by the real object; and enabling the user to see the real object contemporaneous with the one or more images by switching each of the display regions that block the region of the user's field of view occupied by the real object to a pass-through state while the one or more images are displayed to the user via display regions of the pass-through display that do not block, when in the blocking state, the region of the user's field of view occupied by the real object.

2. The computer-implemented method of claim 1, wherein:

the pass-through display is a head-mounted display;

the one or more images convey an evolving artificial-reality environment;

the pass-through triggering event is detected while all the display regions of the pass-through display are in the blocking state and the user is immersed in the evolving artificial-reality environment.

3. The computer-implemented method of claim 2, wherein:

the real object is a type of real object with which the user can interact with the evolving artificial-reality environment; and detecting the pass-through triggering event comprises detecting when the real object is in the user's field of view.

4. The computer-implemented method of claim 1, wherein:

the real object comprises a hazard in the user's real-world environment; and detecting the pass-through triggering event comprises detecting when the hazard endangers the user above a predetermined threshold.

5. The computer-implemented method of claim 1, wherein:

the real object is a type of real object with which the user is likely to interact; and the pass-through triggering event is known to precede an interaction by the user with the real object.

6. The computer-implemented method of claim 1, wherein:

the real object is a type of real object with which the user is likely to interact; and detecting the pass-through triggering event comprises detecting an action by the real object that is likely to precede an interaction by the user with the real object.

7. The computer-implemented method of claim 1, wherein:

the real object is a type of real object with which the user is likely to interact; and detecting the pass-through triggering event comprises detecting an action by the user that indicates an intention to interact with the real object.

8. The computer-implemented method of claim 7, wherein detecting the action that indicates the intention to interact with the real object comprises detecting when the user turns towards the real object.

9. The computer-implemented method of claim 7, wherein detecting the action that indicates the intention to interact with the real object comprises detecting when the user reaches towards the real object.

10. The computer-implemented method of claim 1, wherein:

the real object comprises a person; and detecting the pass-through triggering event comprises detecting an action by the person that is likely to precede an interaction by the user with the person.

11. The computer-implemented method of claim 1, wherein:

the real object comprises a person; and detecting the pass-through triggering event comprises detecting an action by the user that indicates an intention to interact with the person.

12. The computer-implemented method of claim 1, wherein:

the real object comprises a portion of the user's body; and detecting the pass-through triggering event comprises detecting when the portion of the user's body is in the user's field of view.

13. The computer-implemented method of claim 1, wherein:

the real object comprises a portion of the user's body; and detecting the pass-through triggering event comprises detecting an action by the user that indicates an intention to use the portion of the user's body to interact with the user's real-world environment.

14. The computer-implemented method of claim 1, further comprising:

detecting a movement of the real object relative to the field of view of the user;

identifying, after the movement, additional display regions of the pass-through display that block the region of the user's field of view occupied by the real object; and switching each of the additional display regions to the pass-through state.

15. The computer-implemented method of claim 1, further comprising:

detecting a movement of the real object relative to the field of view of the user;

identifying, after the movement, at least one of the display regions of the pass-through display that no longer block the region of the user's field of view occupied by the real object; and returning the at least one of the display regions to the blocking state.

* * * * *